United States Patent [19]

Thompson

[11] 4,052,647
[45] Oct. 4, 1977

[54] OPTIMUM BATTERY RECONNECT FOR A FIELD CONTROLLED ELECTRIC VEHICLE

[75] Inventor: Francis T. Thompson, Murrysville, Pa.

[73] Assignee: Westinghouse Electric Corporation, Pittsburgh, Pa.

[21] Appl. No.: 437,405

[22] Filed: Jan. 28, 1974

[51] Int. Cl.² .......................................... H02D 7/06
[52] U.S. Cl. .................................................. 318/139
[58] Field of Search ............. 318/139, 350, 356, 364, 318/376, 381, 387, 393, 536, 440; 290/50

[56] References Cited

U.S. PATENT DOCUMENTS

| | | | |
|---|---|---|---|
| 1,776,317 | 9/1930 | Huguenin | 318/139 |
| 3,249,836 | 5/1966 | Stamm | 318/139 |
| 3,387,194 | 6/1968 | Banks | 318/139 |
| 3,454,122 | 7/1969 | Grady | 318/139 |
| 3,686,549 | 8/1972 | Winebrener | 318/139 |
| 3,809,978 | 5/1974 | Zubris | 318/139 |

Primary Examiner—Robert K. Schaefer
Assistant Examiner—John J. Feldhaus
Attorney, Agent, or Firm—M. P. Lynch

[57] ABSTRACT

An electric vehicle having a field controlled direct current drive motor powered by batteries which are connectable in a high voltage and a low voltage configuration to change the speed range of the drive motor. Switching of the batteries between the high and low voltage connection is accomplished to provide a relatively smooth transition in both directions and to provide for optimum performance and efficiency. Logic is provided to determine the minimum speed at which high voltage operation is feasible and for initiating switching to the high voltage connection at the determined minimum speed. The minimum speed for operation at the high battery voltage connection is determined as a function of battery open circuit voltage, battery resistance, armature resistance, armature current and field flux. When for the known parameters operation at the high voltage connection is possible, the batteries are switched to the high voltage level. A throttle is provided for controlling the speed of the electric vehicle. At certain lower throttle settings, when the batteries are switched from the low voltage connection to the high voltage connection, the field current is varied to match the new torque at the high voltage connection with the torque previously obtained at the low voltage connection. At certain higher throttle settings, it is not practical to match torque before and after switching when high performance is desired. At these higher throttle settings, torques are not matched and batteries are switched to the high voltage connection at the minimum speed allowing for adequate vehicle control. The torque in the new high voltage connection is then greater than the torque in the prior low voltage connection giving high performance and rapid acceleration.

20 Claims, 10 Drawing Figures

OPTIMUM BATTERY RECONNECT FOR A FIELD CONTROLLED ELECTRIC VEHICLE

CROSS-REFERENCES TO RELATED APPLICATIONS

This application is related to the following applications: (1) U.S. Pat. application Ser. No. 346,552; (2) U.S. Pat. application Ser. No. 346,199; (3) U.S. Pat. application Ser. No. 475,236; (4) U.S. Pat. application Ser. No. 448,862; (5) U.S. Pat. application Ser. No. 430,107.

BACKGROUND OF THE INVENTION

This invention relates to electric vehicles and more particularly to a battery reconnect for use on an electric vehicle driven by a separately excited field controlled direct current drive motor.

In most prior art electric vehicle speed control systems, a direct current (DC) chopper control and a series wound drive motor are used. The chopper is placed in series between a DC power source and the series wound drive motor. The DC chopper controls the speed of the DC series motor by controlling and interrupting the full armature current. The speed of the DC drive motor is controlled by a conventional armature chopper controller which provides complete control of the motor over its entire speed range. The prior art DC chopper controls the time of the pulses and/or the magnitude of the pulses being fed through the armature of the DC drive motor. By varying the parameters of the driving pulses being fed to the armature of the DC drive motor, the speed of the drive motor can be varied. DC chopper control for armature current coupled with a series wound motor is the most commonly used approach for driving prior art electric vehicles. Since the chopper must control the full armature current, it must of necessity be of a large size to handle the large currents involved. Prior art DC choppers required in the armature circuit are bulky and expensive. The conventional chopper controller since it must interrupt and control full armature current requires expensive high powered thyristors and complicated control circuitry for switching and controlling the load current in the armature circuit. Due to the large currents being interrupted cooling of the controller is a problem. Conventional chopper controllers for armature current are also rather inefficient at low to normal operating speeds.

An electronic system for controlling the torque speed characteristics and regenerative braking of a separately excited drive motor for use on electric vehicles is disclosed in cross referenced U.S. Pat. application Ser. No. 346,552. The torque speed characteristics can be controlled by varying the separately excited shunt field of the DC drive motor. As disclosed in the above-mentioned application, the speed of the DC drive motor is controlled from some base speed to a maximum speed. A problem with the speed control as there taught is that the base speed of the DC drive motor is fixed at a relatively high value. It is desirable to be able to operate the DC drive motor at a speed lower than the normal operating base speed. This can be accomplished by connecting the batteries in parallel so as to obtain lower output voltage. The output voltage determines the base speed of the DC drive motor. By providing for series and parallel operation of the batteries two base speeds can be achieved. In prior art connecting schemes, as the switches are opened disconnecting the batteries from one configuration, switches are closed connecting the batteries in another configuration. That is, the batteries are almost simultaneously switched from a connection yielding one voltage level to another connection giving a different voltage level. When this direct switching is attempted while connected to a direct current drive motor, having a separately excited field, excessive current transients and vehicle jerk result. It is desirable to have a battery reconnect means which can change the supply voltage level without excessive current transients or jerky vehicle operation. It is also desirable to have an electric vehicle in which the batteries can be connected in the high voltage configuration at the lowest practical speed. This is desirable since operating efficiency and performance are improved while in the high voltage connection. It is also desirable to have an electric vehicle which provides for rapid acceleration when the throttle is substantially depressed.

At low vehicle speed it is only possible to operate at the lower battery voltage, which is normally obtained with a parallel battery connection, because the obtainable back emf of the motor is inadequate to maintain control of the armature current for the higher voltage level, obtained with the series battery connection. Once a high enough speed is reached, operation from either high voltage or low voltage is possible. Since the performance and efficiency are considerably better for the high voltage connection, it is important to select the high voltage connection whenever possible.

SUMMARY OF THE INVENTION

An electric vehicle is provided with a separately excited field controlled DC drive motor powered from a battery source which can be connected in a high voltage configuration and a low voltage configuration. Apparatus is provided for switching the battery connection from the low voltage level to the high voltage level at the minimum vehicle speed for which operation at the high voltage level is possible. The minimum speed for which operation at the high battery voltage level is possible is a function of battery open circuit voltage, battery resistance, armature resistance, armature current and field flux. The disclosed apparatus permits switching from the low voltage battery connection to the high voltage battery connection as soon as possible. This provides the best performance and increases system efficiency. The disclosed switching apparatus takes into account the conditions of the battery and the current demand, which is a function of throttle setting, and switches sooner to the high voltage connection for low battery voltage or high current demand. The most efficient switching operation from the high voltage condition to the low voltage condition, which depends on the type of battery switching circuit utilized, is also provided. Related case Ser. No. 430,107, discloses various battery switching circuits.

In one embodiment of the invention the armature current flowing through the direct current drive motor is limited to a maximum value. Limiting maximum armature current prevents electric vehicle components from being damaged due to high surge currents or torques. A throttle is provided for controlling vehicle speed. As the throttle is depressed, the field current passing through the separately excited shunt field is weakened causing increased armature current to flow. This increases motor torque and usually will cause the motor to increase speed. The armature current allowed to flow through the direct current drive motor is limited to a maximum safe value. If the armature current prior to switching from a low voltage connection to a high voltage connection is less than the maximum allowable armature current, torque matching is provided. That is, the output torque of the direct current drive motor in the high voltage connection after switching is made approximately equal to the output torque of the direct current drive motor present with the low voltage condition before switching. This provides for smooth vehicle operation during switching.

If the throttle is depressed further, so that the armature current demanded is greater than the maximum allowable armature current, the motor torque after switching to the high voltage connection will be greater than the motor torque before switching. This is the operating region of throttle setting where high performance is desired. In this high performance mode it is more desirable that acceleration be rapid rather than the torques before and after switching be matched. For a given throttle setting in this high performance region, the armature current drawn during the low voltage connection is limited to the maximum value. The torque provided by this maximum current in the low voltage connection is lower than the desired torque for a given throttle setting in the high performance region. This desired torque can be provided after switching to the high voltage connection by a given value of armature current which is, in general, less than the maximum allowable armature current. When the minimum speed for which operation at the high battery voltage with this given value of armature current is possible, determined from battery voltage, battery resistance, armature resistance, armature current and field flux the batteries are switched to the high voltage level and a higher output torque determined by the throttle setting is achieved. That is, the output torque of the DC drive motor after switching to the high voltage level is higher than the output torque of the DC drive motor present before switching from the low voltage level. Armature current and thus output torque are still limited in the high voltage connection to some maximum value but the desired armature current and torque values are generally lower than the limiting values in the high voltage connection.

When armature current is limited to a maximum value allowable for the motor, the torque available in the low voltage battery connection is limited. For throttle settings, corresponding to output torque less than the maximum, the high voltage and the low voltage torques can be matched. For higher throttle settings while in the low voltage connection, corresponding to a torque demand greater than the maximum allowable torque, the output torques before and after battery switching can no longer be matched.

Apparatus for switching the batteries from the high voltage connection to the low voltage connection at the optimum point can also be provided. Optimum switching from the high voltage connection to the low voltage connection depends on the battery reconnect method used. Several battery reconnect methods are explained more fully in copending application, Ser. No. 430,107.

For switching apparatus which utilizes diodes in the parallel circuits through the batteries to prevent regenerative current (negative armature current) from flowing while in the low voltage connection it is desirable to remain in the high voltage connection until maximum field current is reached and until the armature current reaches zero or just becomes positive. This will provide the maximum amount of regeneration since no regeneration is possible when the series connection through the batteries is opened, and the batteries are connected in parallel through the diodes.

For a reconnect operation utilizing contactors or switches in the series and parallel circuits through the batteries where regeneration can occur in both the high and low voltage ranges, it is desirable to switch to the low voltage connection as soon as maximum field current is reached. Any attempt to operate with the field current greater than 100% will result in more positive than desired armature current and more positive than desired torques. In the low voltage connection the field current will be adjusted by a field controller until the desired regenerative field current is obtained.

A low voltage battery is provided to keep the DC drive motor idling when the vehicle is stopped during operation. Low speed idling provides oil pump action in the automatic transmission which provides lubrication and smooth starting. Low speed idling also requires less power than when idling at a higher base speed.

It is an object of this invention to provide a simple, effective means of selecting the proper voltage connection for a variety of conditions.

BRIEF DESCRIPTION OF THE DRAWINGS

For a better understanding of the invention, reference may be had to the preferred embodiment exemplary of the invention shown in the accompany drawings, in which.

DESCRIPTION OF THE PREFERRED EMBODIMENTS

Figure 1:
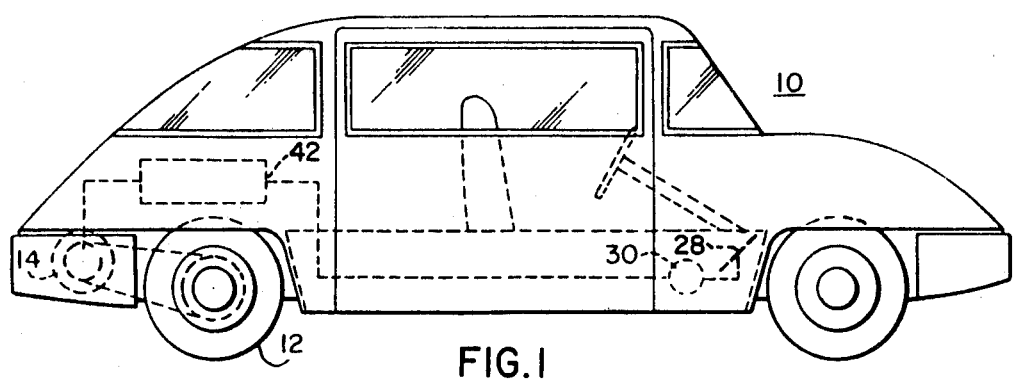
FIG. 1 shows an electric vehicle.

Referring now to the drawings, there is shown an electric vehicle 10 having a control system utilizing the teaching of the present invention.

Figure 2A:
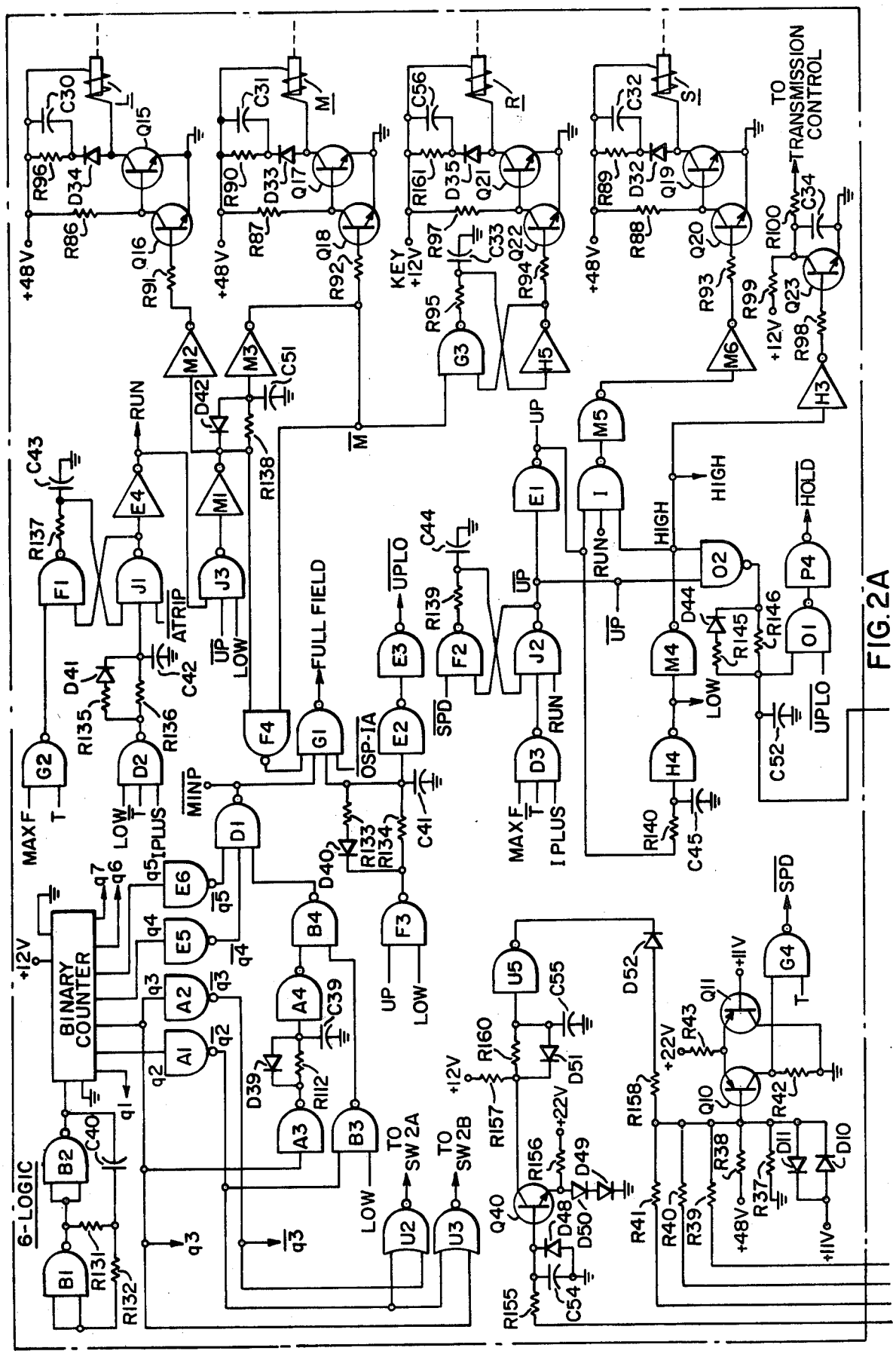
FIGS. 2A, 2B and 2C are a schematic showing a complete electric circuit for an electric vehicle utilizing the teaching of the present invention.
Figure 2B:
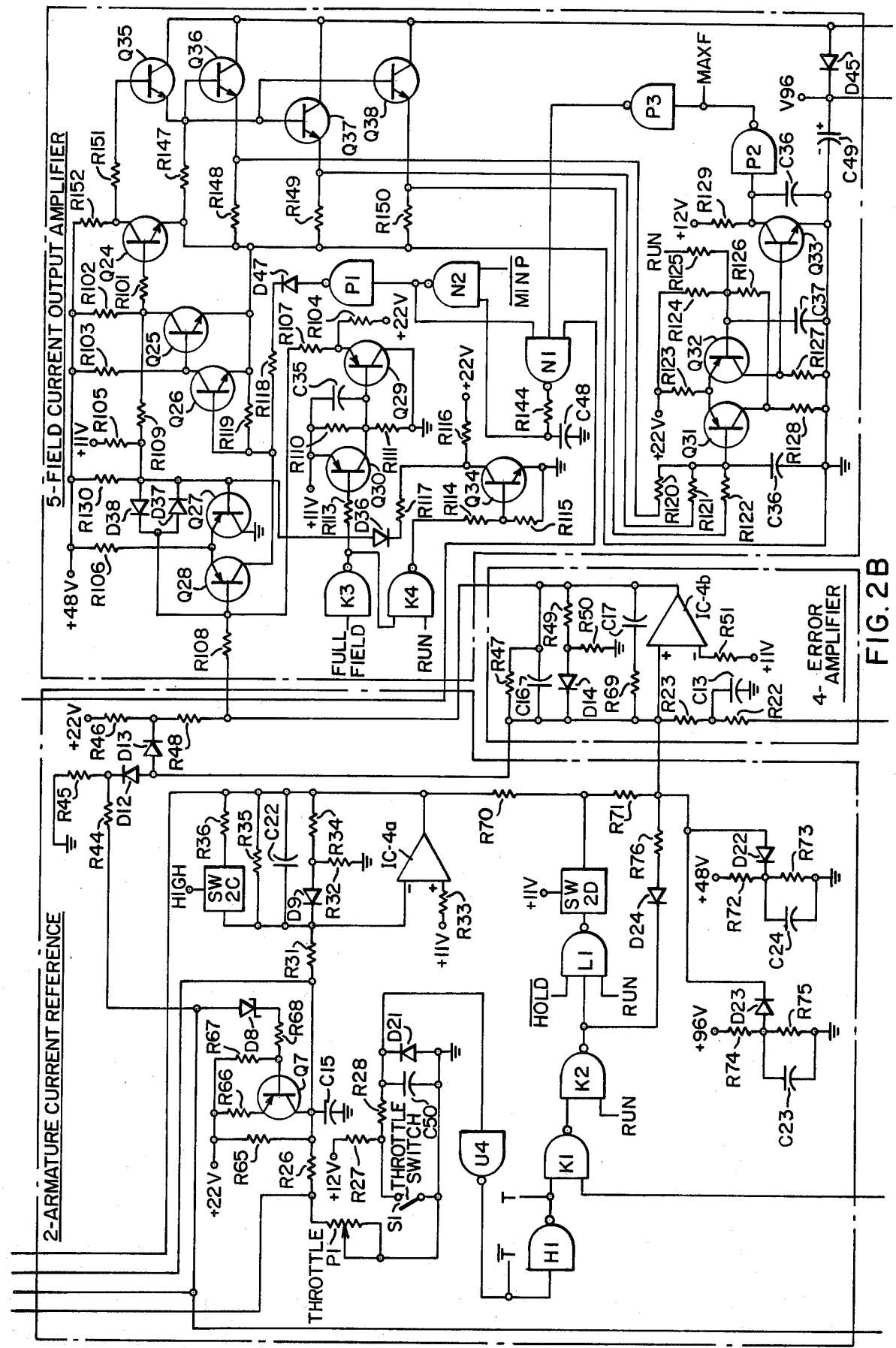
Figure 2C:
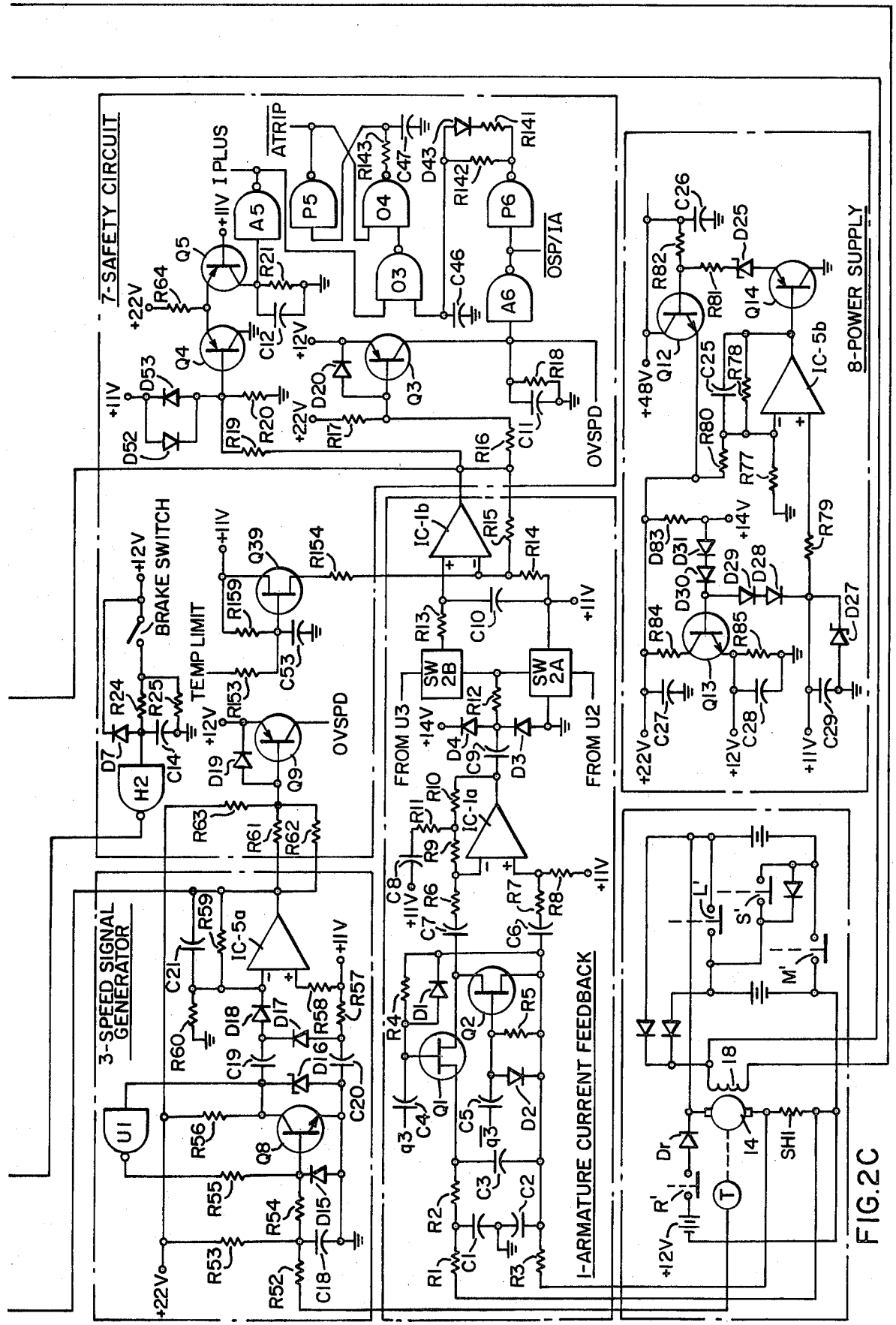

Electric vehicle 10 has drive wheels 12 driven through a drive system by a direct current drive motor 14. The DC drive motor 14 is of the type having shunt field windings 18, shown in FIG. 2C, which can be separately excited for speed and torque control, a torque converter can be utilized to control the speed of the electric vehicle 10, when operating at less than a predetermined base speed as described more fully in U.S. Pat. application Ser. No. 346,199 (Westinghouse Case 44,493). A direct current power supply, which is normally a battery pack 16, shown in FIG. 6 or 7, which can be connected in a high voltage connection and a low voltage connection, supplies power to the direct current drive motor 14. The separately excited field winding 18 of the direct current drive motor 14 is supplied with excitation current from controller 42, shown in FIG. 7. The excitation current supplied to the field windings 18 controls the torque speed characteristics and the regenerative braking of the separately excited direct current drive motor 14.

At low speeds, it is only possible to operate electric vehicle 10 with the low battery voltage connection because obtainable back emf of the motor 14 is inadequate to maintain control of the armature current for the high voltage connection. Once a high enough speed is reached, operation at a high voltage or low voltage is possible. Since the electric vehicle's 10 performance and efficiency are considerably better for the high voltage connection, it is important to select the high voltage connection whenever possible. The minimum speed of drive motor 14 for which operation at the high battery voltage is possible, is a function of a number of variables: battery open circuit voltage, battery resistance, armature current, armature resistance and field flux. This invention teaches apparatus for selecting the proper voltage connection for a variety of operating conditions.

Figure 3:
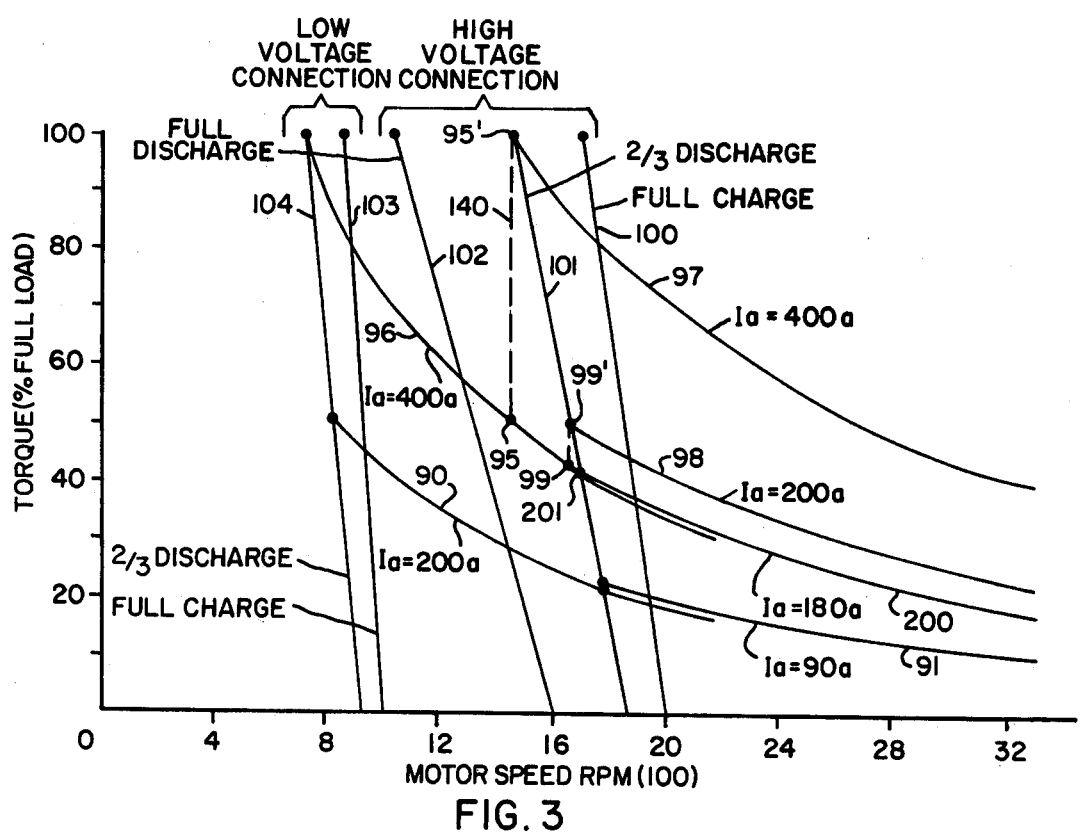
FIG. 3 is a graph of torque versus motor speed for various battery conditions of charge at both the high voltage connection and the low voltage connection.

The problems associated with switching to the high voltage level can be more easily understood by reference to FIG. 3 which shows the output torque versus motor speed of drive motor 14 for various armature currents for both the high voltage and low voltage battery connection. A locus of 100% field points for the high and low voltage connections for different battery charge states is shown. The 100% field lines are indicated in FIG. 3 by lines 100, 101, 102, 103 and 104. The 100% field line is shown for various conditions: line 100 is for a high voltage connection with the batteries fully charged; line 101 is for a high voltage connection with the batteries two-thirds discharged; line 102 is for a high voltage connection with the batteries fully discharged; line 103 is for a low voltage connection with the batteries fully charged; and, line 104 is for a low voltage connection with the batteries two-thirds discharged. An optimum strategy results from operating in the high voltage connection whenever the operating point falls to the right of the high voltage 100% field locus 100, 101, 102 and operating in the low voltage connection whenever the operating point falls to the left of the high voltage 100% field locus 100, 101, 102. Any attempt to operate to the left of the locus in the high voltage condition will result in higher than desired armature current and therefore higher than desired torque. This is due to the fact that the separately excited field is quite saturated for 100% field and therefore additional motor emf is not available.

The characteristics shown in FIG. 3 will now be explained mathematically. For the low voltage connection where the batteries are operated in parallel the back EMF (Eemf) generated by the direct current drive motor 14, is:

$$Eemf = kn\phi \quad (1)$$

where
 $k$ is a constant
 $n$ is motor speed (rpm)
 $\phi$ is per unit flux (1.0 representing 100% field flux).
The output torque ($\tau$) for drive motor 14, is:

$$\tau = C Ia\phi \quad (2)$$

where
 $C$ is a constant
 $Ia$ is the armature current
For a high voltage series of two batteries, each of which having an open circuit voltage of V and an internal resistance of Rb, the high voltage armature current (Iah) is:

$$Iah = (2V - Eemf)/(Ra + 2Rb) \quad (3)$$

where $Ra$ is the armature resistance of drive motor 14. Combining equations 1, 2 and 3 the equation for speed ($n$) is obtained:

$$n = \frac{2V - (\tau/c\phi)(Ra + 2Rb)}{k\phi} \quad (4)$$

For 100% field excitation $\phi = 1.0$ and the locus for 100% field can be determined from:

$$n = \frac{2V - Iah(Ra + 2Rb)}{k} \quad (5)$$

It is undesirable to switch to the high voltage connection at a motor speed lower than that determined from equation 5. Equation 5 indicates the minimum speed for high voltage operation. As shown the 100% field for the high voltage connection, which represents the ideal switching locus for reconnecting from the parallel battery low voltage connection to the series battery high voltage connection is dependent on V and Rb. For a typical lead acid battery the following conditions are normal, for the high voltage connection:

|  | Open Circuit Voltage (2V) | Battery Resistance 2Rb |
|---|---|---|
| Fully Charged | 100V | .040 ohms |
| ⅔Discharge | 94V | 0.55 ohms |
| Fully Discharged | 80V | .075 ohms |

FIG. 3 shows the 100% field line for various battery conditions as determined by Equation (5). As explained above, line 100 represents the 100% field locus for the batteries in series and fully charged; line 101 represents the 100% field locus for the batteries in series and two-thirds discharged; line 102 represents the 100% field locus for the batteries in series and fully discharged; line 103 represents the 100% field locus for the batteries in parallel and fully charged; and line 104 represents the 100% field locus for the batteries in parallel and two-thirds discharged.

In actual operation it is undesirable to operate the batteries lower than two-thirds discharged.

Figure 4:
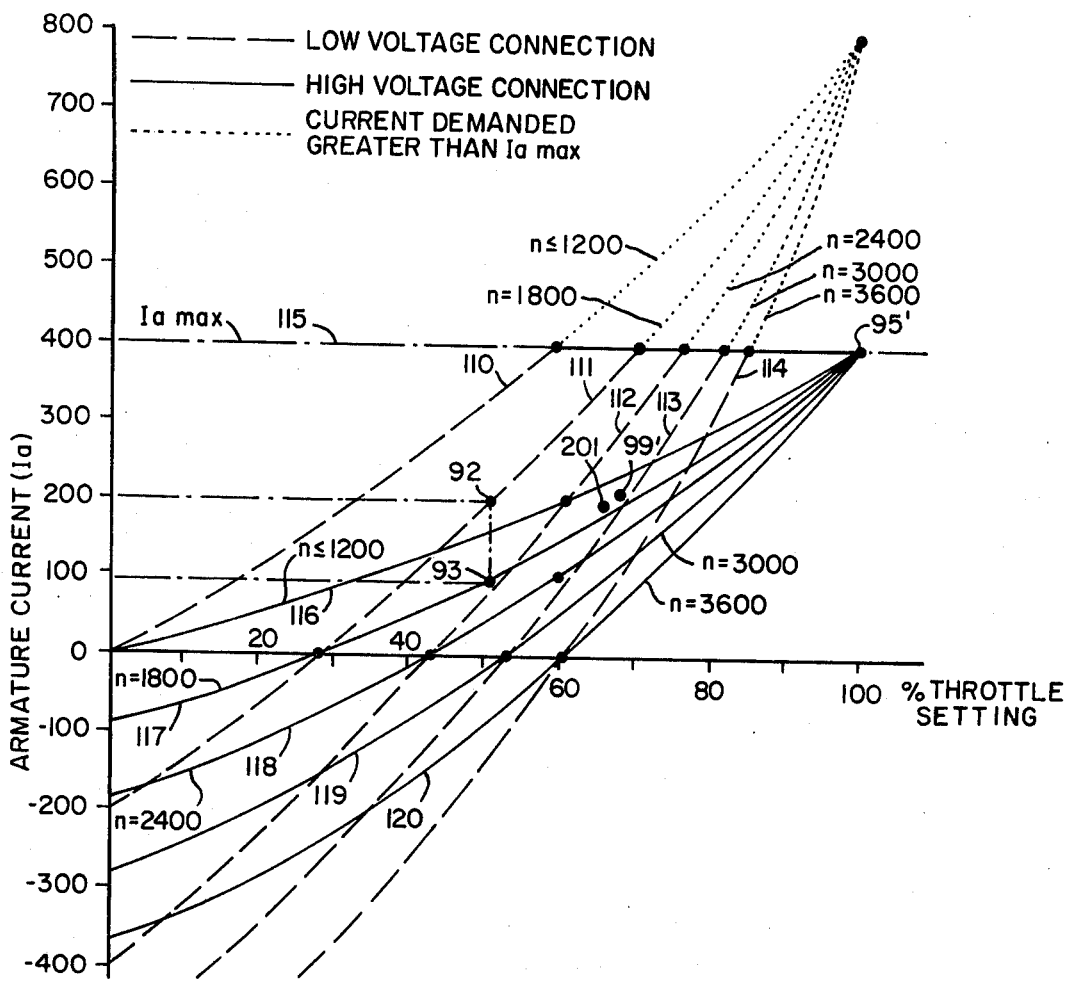
FIG. 4 is a graph showing armature current versus throttle setting for various drive motor speeds with the high voltage battery connection and the low voltage battery connection.

For the batteries connected in series the high output voltage ($V_h$) of battery pack 16 is:

$$V_h = 2V - 2 \text{ Iah Rb}$$

for the batteries connected in parallel the low output voltage ($V_l$) of battery pack 16 is:

$$V_l = V - \tfrac{1}{2} \text{ Ial Rb}$$

when operating in the low voltage parallel connection the value of $V_l$, Ial and $n$ are available and Rb is approximately known. Iah, the armature current that will be drawn after switching to the series high voltage connection can be estimated from the low voltage connection armature current and the throttle setting T. For the lower throttle range where torques are matched before and after reconnect, close matching of the torques can be obtained by selecting:

$$Iah = p\, Ial$$

Where $p$ is a constant selected for close matching. For an idealized case where the armature resistance (Ra) is zero $p = 0.5$ will give exact torque matching. Actually $p$ must be less than 0.5 to compensate for armature resistance. Referring now to FIG. 4, there is shown armature current (Ia) versus throttle setting for various speeds. Curves 110, 111, 112, 113 and 114 are for the low voltage parallel connection for various throttle speed settings. The dotted portions of these curves represent current demanded by the throttle setting which is larger than the allowable maximum armature current represented by line 115. For throttle settings, asking for armature current in the low voltage connection, less than maximum armature current 115 the torques can be matched before and after battery switching. As stated in equation (5) the minimum switching speed is:

$$n = \frac{2V - Iah\,(Ra + 2Rb)}{k} \qquad (5)$$

substituting for $Iah = p\, Ial$ we get $$n = \frac{2V - p\, Ial\,(Ra + 2Rb)}{k} \qquad (6)$$

for an idealized case where $Ra = 0$ a value of $p = 0.5$ will provide for exact torque matching. For a standard DC motor with a typical value of $Ra = 0.015$ ohms a value of $p = 0.46$ will provide close torque matching. Multiplying the right-hand portion of equation 6 by $2Rb/2Rb$ rearranging $$n = \frac{2V - p\, Ial\,(Ra + 2Rb)}{k} \cdot \frac{(2Rb)}{(2Rb)}$$

$$n = \frac{2V - 2p\frac{(Ra + 2Rb)}{2Rb}\, IalRb}{k}$$

letting $$m = 2p\frac{(Ra + 2Rb)}{2Rb}$$

we have $$n = \frac{2V - m\, IalRb}{k} \qquad (7)$$

The term $m$ for a typical motor/battery combination where $p = 0.46$, $Ra = 0.015$ ohms and $2Rb$ has a range of 0.040 ohms (fully charged) to 0.075 ohms (fully discharged) varies from 1.26 (fully charged) to 1.10 (fully discharged). If a value of m is selected from this range, a locus of reconnect speed values which are close or equal to the ideal switching speeds is obtained.

For the higher throttle range where Ial requested by the throttle setting is greater than Ia maximum 115 it is not desirable to match torque before and after switching. For these higher settings where high performance rapid acceleration is required it is desirable to have a higher torque in the high voltage connection after switching than in the low voltage connection before switching.

That is, an increase in torque is desirable for the rapid acceleration demanded by the higher throttle setting. For the higher throttle setting, using peak low connection current (Ial) to estimate high connection current (Iah) after switching will give a value of Iah which will be low by some value. This is due to the fact that Ial, as shown by FIG. 4, is limited to Imax 115. If the low voltage armature current demanded by the throttle setting, shown in FIG. 4 by dotted lines for the portion greater than Imax 115, is used, no error in estimating the high voltage connection armature current (Iah) is introduced. That is, referring to FIG. 4, curve 116, 117, 118, 119 and 120 represent values of Iah for increasing motor speed, and curves 110, 111, 113 and 114 represent values of Ial for increasing motor speed. When the value of Ial during operation falls below Imax 115, torque before and after switching will be matched, if, Iah is selected equal to a predetermined constant ($p$) times Ial. For the higher throttle region where torque matching is undesirable a correction term must be added for calculating minimum switching speed. Minimum switching speed can then be determined from the equation:

$$n = \frac{2V - m\, IalRb - Ierror\,(Ra + 2Rb)}{k} \qquad (8)$$

A signal proportional to Ierror can easily be obtained.

$$Ierror = (k_1 V_t - k_2 Var) \qquad (9)$$

where $V_t$ is a voltage proportional to the throttle setting Var is a voltage proportional to actual armature current which is limited to some maximum value Imax 115 and $k_1$ and $k_2$ are constants selected so that $k_1 V_T - k_2 Var = 0$ in the low throttle range. Substituting for Ierror we have:

$$n = \frac{2V - m\, IalRb - (k_1 V_t - k_2 Var)(Ra + 2Rb)}{k}$$

It should be noted that $2V_1 = 2V - IalRb$, and thus if $m$ is assumed equal to 1.0 the term $2V - m\, IalRb$ can be replaced by $2V_1$. The small discrepancy in $m$ between 1.0 and for example 1.15 can be corrected by adjusting the constant $k_2$ to a new value $k_2'$ since Ial is proportional to Var. Thus:

$$n = \frac{2V_1 - (k_1 V_T - k_2'\, Var)(Ra + 2Rb)}{k} \qquad (10)$$

This equation is easily realizable in a voltage comparison circuit which sums voltages proportional to signals $V_1$, $V_t$, Var and $V_n$ and calls for switching to the high voltage configuration when the sum is negative with respect to a reference voltage, $V_{ref}$. That is:

$$V\,\text{sum} = -K_n V_n + K_1 V_1 + Kar\, Var - K_t V_t \qquad (11)$$

where:
$V_n$ is a voltage proportional to motor speed;
$V_t$ is a voltage proportional to throttle setting;
Var is a voltage proportional to the armature current limited to Imax 115; and,
$V_1$ is equal to the battery output voltage in the low voltage connection.

An operational amplifier or differential transistor pair can be used as the voltage comparator. The locus of the switching points defined by equation (8) or equation (10) can be made to lie just slightly right of the locus of 100% flux shown in FIG. 3 and thus represents a near optimum switching locus. It can be shifted as close as desired to the 100% flux locus by proper selection of parameters.

A less complex switching point means can be obtained by neglecting the effect of the maximum current limit means in determining the current drawn after reconnecting to high voltage Iah from the value of current before reconnecting Ial. This is equivalent to neglecting Ierror of equation (9) and assuming Iah always equals $p$ Ial. In this case equation (10) can be simplified to:

$$n = \frac{2V_1 - k_3 Var(Ra + 2Rb)}{k} \quad (12)$$

where:

$$k_3 = k_2 - k_2'$$

The term $-k_3$ Var (Ra + 2Rb) represents the correction for m differing slightly from a value of 1.0. If this difference is neglected then $k_3$ can be chosen as zero giving an even simpler result:

$$n = (2V_1/k) \quad (13)$$

Whereas, equation (10) requires summing signals related to battery voltage, motor speed, armature current and throttle setting equation (12) requires summing only signals related to battery voltage, motor speed and armature current and equation (13) requires only summing signals related to motor speed and battery voltage.

Referring now to FIGS. 3 and 4, some examples of battery switching with and without torque matching will be given. Referring now to FIG. 3 for an armature current Ial = 200 amps a curve represented by line 90 is obtained for a two-thirds discharged battery in the low voltage connection. If Ia max is set at 400 amps the torques are matched when the batteries are switched from the low voltage connection to the high voltage connection. When battery connections are switched, Iah in the high voltage connection will be approximately equal to 90 amps as indicated by line 91 of FIG. 3. The batteries will be switched at a speed approximately equivalent to that indicated when line 90 crosses the 100% field locus 101 for a two-thirds discarged battery. As can be seen, at this point, the torques before and after switching are almost matched. This switching operation can be illustrated from the curves in FIG. 4. For a speed approximately equal to 1800 rpm an armature current in a low voltage connection equal to 200 amps is drawn. The battery connection can be switched at point 92 on curve 111 to point 93 on curve 117 and the torque matching armature current in the high voltage connection will be equal to approximately 90 amps.

With a maximum armature current of 400 amps, a low voltage connection having a throttle setting which demands low voltage current greater than 400 amps will be switched with an increase in torque. For example, if the throttle is completely depressed, so that the maximum armature current will be demanded in both the low and high voltage connection, the vehicle is switched at a speed equivalent to line 95—95' shown in FIG. 3, to the high voltage connection and vehicle operation will continue along line 97. That is the vehicle operating characteristic will switch from curve 96 to curve 97 along the dashed line 140 from point 95 to point 95'. For a throttle setting with an armature current in the high voltage connection of 200 amps, high voltage operation will be along curve 98. The transfer point for switching battery connection will be at a speed equivalent to point 99. In these cases a torque increase will occur when switching from the low voltage connection to the high voltage connection. For a throttle setting demanding a high voltage connection armature current equal to aproximately 180 amps operation will be along curve 200. The torques can be matched before and after the switching and the transfer from the low voltage connection to the high voltage connection will occur at point 201. On FIG. 4, point 95', point 99' and point 201 for the high voltage connection are indicated.

Figure 5:
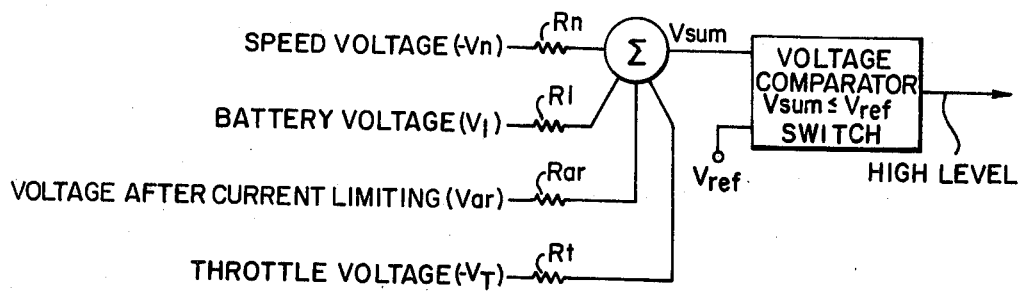
FIG. 5 is a schematic view of apparatus for determining the minimum speed for switching to the high voltage connection.

Referring now to FIG. 5, there is shown an electric circuit which can be utilized for determining the minimum switching speed. Equation (11) can be realized using resistive summing if voltages $-V_n$, $V_b$, Var and $-V_t$ are applied to resistors $R_n$, $R_b$, Rar and $R_T$ respectively as shown in FIG. 5. This circuit initiates switching to the high voltage level when the voltage sum ($V$ sum) = $-K_nV_n + K_lV_l + K_{ar} Var - K_tV_t$, is less than reference voltage $V_{ref}$. Resistors $R_n$, $R_b$, Rar and $R_t$ are inversely proportional to constants $K_n$, $K_b$, Kar and $K_t$ respectively.

Apparatus is also provided for determining the optimum speed to switch from the high voltage connection to the low voltage connection. The optimum point for connecting from the high voltage connection to the low voltage connection depends upon whether regenerative braking is possible in the low voltage connection. For a diode circuit an embodiment of which is shown in copending case U.S. Pat. application Ser. No. 430,107, regenerative braking in the low voltage connection is not possible. For this connection, the high voltage configuration should be retained until maximum field current is reached and until the armature current reaches zero or just becomes positive. For example, when the vehicle is operating in the high voltage range, and the throttle setting is reduced such that a small positive armature current is demanded, the vehicle will slow down and the motor speed will decrease. This will reduce the back emf and therefore the field current will be increased by the field controller to maintain the desired armature current. This process can continue until the field current reaches its full value after which the armature current will rise rapidly and keep the motor running at a speed near the base speed of the motor for the high voltage connection. A typical value of the high voltage base speed is 1920 rpm for 96 volts. Operation with field current greater than 100% is undesirable since control of the motor is lost and the desired idle speed of approximately 960 rpm for 48 volt low voltage connection will not be reached. For this case, it is desirable to remain in the high voltage connection until the field current reaches its full value and then switch to the low voltage connection. This will allow the motor speed to fall to about 960 rpm if desired. For a case where a low or zero throttle setting is selected while operating at high speeds, a regenerative current is demanded. The retarding energy is converted to electrical energy to charge the battery and the speed drops more quickly than in case 1. In this case, the field controller demands a higher field current for a given speed. This provides the higher back emf which is needed to charge the batteries by means of the negative armature current. For the diode circuit where regenerative braking in the low voltage connection is not possible, the high voltage connection should be retained until maximum field current is reached and until the armature current reaches zero or just becomes positive. This will provide the maximum amount of regeneration since no regeneration is possible once the high voltage circuit is opened and operation is in the low voltage configuration. In an operation where a constant value of regenerative current is desired the field current will be increased until its maximum value is reached after which the armature current will fall to zero and reverses as the motor speed falls.

The optimum strategy for operation where the switching circuit which can regenerate in both the low and high voltage range is to switch to the low voltage connection as soon as maximum field current is reached. After switching to the low voltage connection, the field current will be adjusted by the field controller until the desired regenerative current is obtained. For this embodiment, only a single voltage comparator is required which determines if field current is greater than the maximum desired field current. When this condition is satisfied, the batteries are switched to the low voltage connection.

Figure 6:
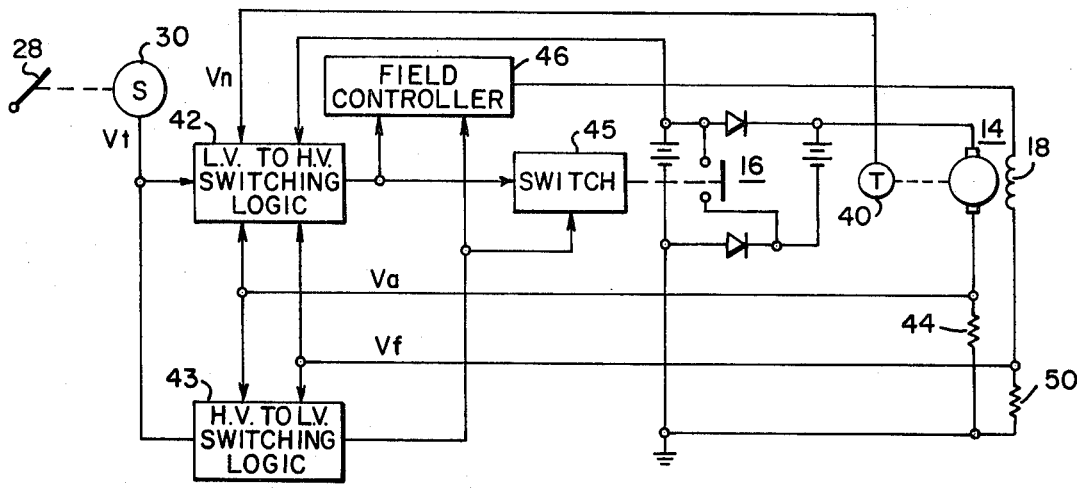
FIG. 6 is a schematic showing a switching circuit using diodes utilizing the teaching of this invention.

Referring now to FIG. 6, there is shown apparatus for optimum circuit switching. A battery pack 16 utilizing two diodes and a single switch for series/parallel operation as described more fully in copending application Ser. No. 430,107, is provided for supplying a high voltage connection and a low voltage connection to drive motor 14. The tachometer 40 is provided for supplying a voltage signal Vn proportional to the speed of drive motor 14. Signal Vn is fed to controller 42 which determines the optimum speed for switching from the low voltage connection to the high voltage connection. A current shunt 44 in the armature circuit supplies a voltage Va proportional to armature current Ia. Signal Va is fed to controller 42 and controller 43, which is provided for switching from the high voltage connection to the low voltage connection at the optimum speed. Signal Va is equivalent to signal Var which is proportional to armature current limited to Imax 115. Voltage $V_t$ proportional to the throttle setting 30 is also supplied to controller 42 and 43. A signal $V_1$ is also fed to the switching controller 42. The low voltage to high voltage switching controller 42 determines the minimum speed for switching from the low voltage connection to high voltage connection. The minimum speed is a function of battery voltage, battery resistance, armature current and field flux. The minimum switching speed can be determined by solving Equation (8):

$$n = \frac{2V - m\ Ial\ Rb - Ierror\ (Ra + 2Rb)}{K}$$

and switching to the high voltage connection when the minimum speed is reached. When the minimum switching speed is reached, switching controller 42 activates field controller 46 to supply full field current through separately excited windings 18 to rapidly increase the field of drive motor 14. When the field flux of drive motor 14 approaches 100%, controller 42 activates operator 45 to close the switch of battery pack 16 completing a series circuit and supplying a higher voltage level to drive motor 14. Shunt 50 which is provided in the field circuit to supply a voltage $V_f$ proportional to the field current to controllers 42 and 43 which may be used to indicate the attainment of 100% field flux. Thus, when controller 42 determines that the minimum speed for switching to the high voltage connection is reached, it increases the field excitation to a predetermined value then closes the series switch through battery pack 16. Rather than measuring and comparing field current the high voltage connection can be made after a time delay, which allows field current to approximately reach 100%.

When the vehicle is slowing down and throttle 28 is not depressed it is desirable to switch from the high voltage connection to the low voltage connection controller 43 at some optimum speed. For a vehicle 10 using the diode battery reconnect for battery reconnect pack 16, as shown in FIG. 6, it is desirable to switch from the high voltage connection to the low voltage connection only when field current reaches some maximum and armature current is approximately zero. For example, with a low or zero throttle setting when operating at a high speed, a regenerative current is demanded. The vehicle energy is converted to electrical energy to charge the battery and the speed drops quickly. For this case, the field controller demands a higher field for a given speed than it does with a high throttle setting. This provides the higher back emf which is needed to charge the battery by means of negative armature current. The optimum switching strategy for this case is to remain in the high voltage connection until maximum field current is reached and until the armature current reaches zero or just becomes positive. This will provide the maximum amount of regeneration since no regeneration is possible once the series switch through battery pack 16 is open and battery pack operation is in the low voltage mode. The circuit shown in FIG. 6 provides this desirable operation. Switching logic circuit 43 will determine the optimum speed for switching to the low voltage connection as a function of throttle setting, armature current, and field current. In operation for a constant desired value of regenerative current or negative armature current, field current will be increased until its maximum value is reached after which the negative armature current will fall to zero and reverse as the motor speed falls.

The sensing of the throttle 28 position and use of this information in comparison with a predetermined throttle position can be used to prevent undesirable frequent or oscillatory switching between series and parallel battery connections when operating in a motor speed range near the switching characteristic 100 or 101 of FIG. 3. Alternatively, other means such as time delays between switching can be used to inhibit excessively frequent switching between the high and low voltage connections.

Figure 7:
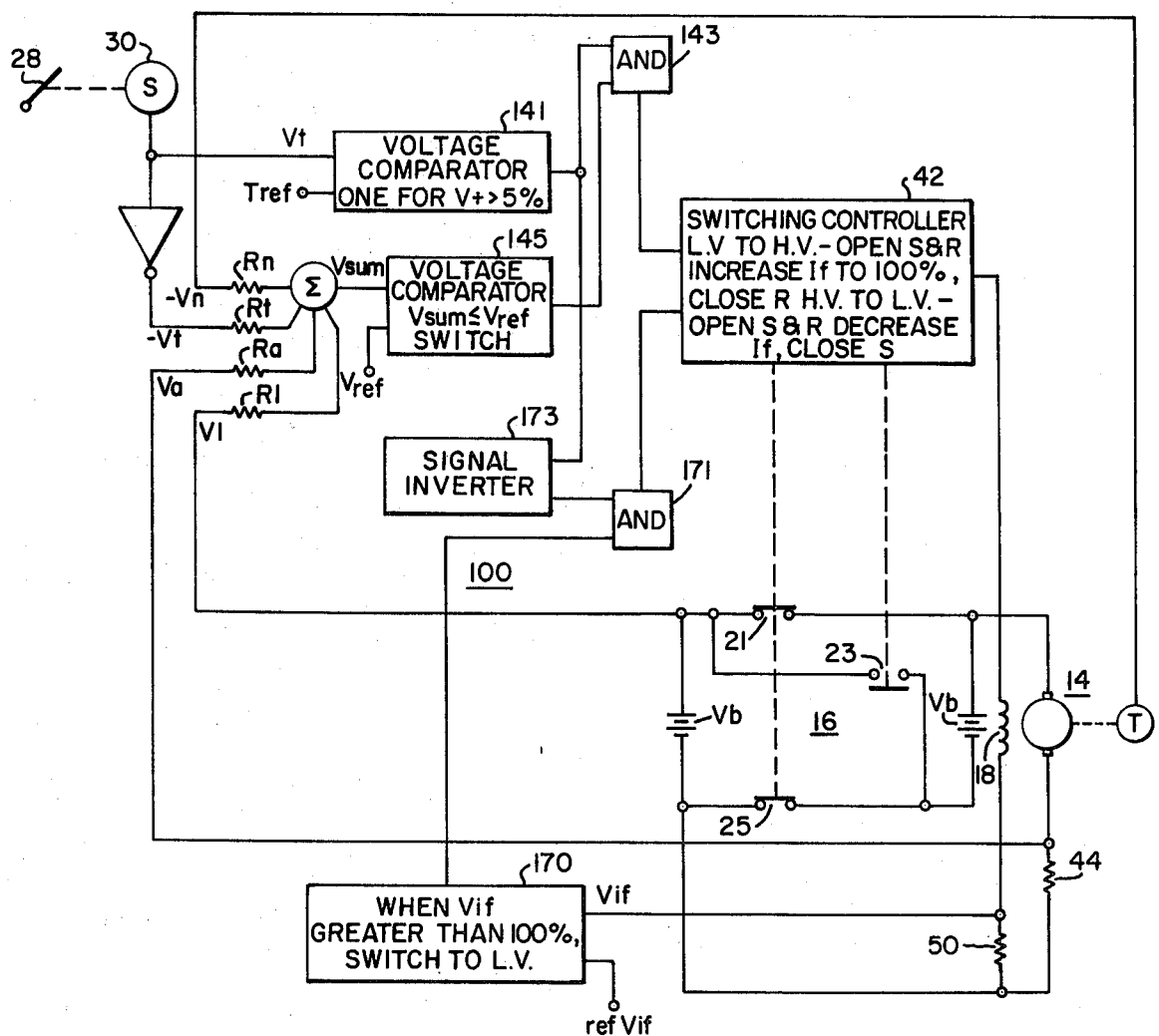
FIG. 7 is a schematic of a battery switching circuit utilizing contactors employing the teachings of this invention; and, FIG. 8 is a block diagram of the control circuit shown in FIG. 2.

Referring now to FIG. 7 there is shown a control circuit for an electric vehicle in which battery pack 16 is switched from a low voltage parallel connection to a high voltage series connection by use of contactors 21, 23 and 25. Contactors 21 and 25 complete a parallel path through the battery pack 16 and contactor 23 completes a series path through battery pack 16. Operation of this battery reconnect is more fully described in copending application Ser. No. 430,107. A voltage comparator is used to initiate a switching from the low voltage connection to the high voltage connection when the $V$sum is less than or equal to a zero reference voltage. $V$sum is a function of speed, throttle setting, armature current and battery voltage. That is, $V\text{sum} = K_tV_t - K_nV_n - K_tV_t + KarVar$ where $K_t$, $K_n$, $K_t$ and $Kar$ are constants, $V_f$ is proportional to the battery voltage, $V_n$ is proportional to speed, $V_t$ is proportional to throttle setting, and Var is proportional to armature current. When Vsum becomes negative with respect to $V_{ref}$ the optimum speed for switching to the high voltage connection has been reached. At this point, an enabling signal is sent from voltage comparator 145 and gate 143. AND gate 143 is also supplied with a signal from voltage comparator 141 which enables the AND gate if the throttle setting is greater than a given value, e.g. 5%. If both signals from comparators 141 and 145 are present to enable AND gate 143, the AND gate sends a signal to switching controller 42 to switch from the low voltage connection to the high voltage connection. Controller 42 opens all contactors 21, 23 and 25 and increases current flowing through field winding 18 to a predetermined value approaching 100%. When this value is reached, contactor 23 completing the series path through battery 16 is closed, increasing the voltage level supplied to drive motor 14. Alternatively, rather than measuring and comparing field current, controller 23 can be closed after a time delay which allows the field current to approximately reach 100%.

For operation with the circuit shown in FIG. 7 which can regenerate in both the low and high voltage connections the optimum time to switch from the high voltage connection to the low voltage connection is as soon as the maximum field current is reached provided that the throttle setting is less than a given value, e.g. 5%. In the low voltage connection the field current will be adjusted by the field controller until the desired regenerative current is obtained. In this embodiment voltage comparator 170, shown in FIG. 7 determines if the field current is greater than its 100% full field current value. If this condition exists, a ONE signal from comparator 170 is applied to AND gate 171.

Referring now to FIGS. 2A, 2B, 2C, and 8, there is shown a feedback field control circuit 100 for an electric vehicle utilizing the teaching of the present invention. This control circuit 100 will now be described in detail.

The feedback field control circuitry can be divided into a number of functional areas:

1. Armature Current Feedback 1 — provides an output feedback signal proportional to armature current. A shunt SH1 provides a signal having a value of 0.1 mv per ampere of armature current. The armature current feedback 1, provides a signal which is inversely proportional to armature current (Ia) having for instance a value of 7V for Ia = +400A, 11V for Ia = 0, and 15V for Ia = −400A.

2. Armature Current Reference 2 — provides an armature current reference signal which represents the desired value of motor armature current. The output voltage signal of the armature current reference is a function of throttle setting, throttle switch S1, and motor speed. The output signal of the armature current reference 2 is also influenced by various operating conditions such as: (1) for the high voltage connection regenerative voltages above 130V tend to reduce the regenerative current demand signal; (2) for the low voltage connection where a high current drain pulls battery voltage below 30V the demand signal is reduced; (3) for higher motor speeds, above 3000 rpm, which may cause commutator sparking and damage, the demand signal is reduced; and, (4) for low field current values the demand signal is reduced.

3. Speed Signal Generator 3 — produces a signal having a frequency proportional to motor speed, where energy per pulse is constant so current varies as speed. This signal is modified to provide an output voltage inversely related to motor speed. For example, the output signal = 17V at zero speed and decreases 3 volts for each 1000 rpm increase in speed.

4. Error Amplifier 4 — compares the armature current reference signal with the armature current feedback signal and provides a voltage signal which is proportional to the desired value of field current.

5. Field Current Output Amplifier 5 — amplifies the voltage signal from the error amplifier 4 and provides field current to the drive motor 14. The field current output amplifier 5 uses pulse width modulation with some minimum pulse width provided for supplying a minimum value of field current to the drive motor 14. The field current output amplifier is coupled to the 48V battery supply to keep field output current constant as battery voltage decreases. Before starting and when idling maximum field current is regulated at 8 amps.

6. Logic 6 — determines when to switch battery connections. On starting, contactor L is first energized then after a slight time delay M is energized. Logic 6 initiates switching battery connections at the optimum time.

7. Safety Circuits — provide safety features some of which are: (1) depressing the brake pedal results in regenerative braking even with the throttle wide open; (2) if motor speed exceeds 3700 rpm, full-field current is demanded and the throttle signal is cancelled; (3) if armature current exceeds 500 amps full-field current is demanded; (4) a field current of at least 8 amps must be present before voltage can be applied to the armature; and, (5) if the drive motor overheats the armature current feedback signal is increased and actual armature current will be reduced permitting operation at reduced performance.

8. Power Supply — provides regulated +11V, +12V, +14V, and +22V output supplies even though the input voltage varies over a wide range.

The functional areas listed above will now be described in more detail.

1. ARMATURE CURRENT FEEDBACK

The armature current of the motor flows through a 0.1 milliohm shunt SH1. The signal from the shunt SH1 is brought to the control by means of a twisted shielded pair of wires to terminals connected to resistors R1 and R3. Resistors R1 and R3, in conjunction with capacitors C1 and C2, form a low pass filter which minimizes the introduction of spurious electrical noise signals into the control. The second section of filtering is provided by resistor R2 and capacitor C3. The signal from the shunt can have either a positive or negative polarity depending upon whether the motor is being operated in the motoring or regenerative mode. The shunt SH1 provides a 40 millivolt signal for an armature current of 400 A. This signal, after filtering, appears across capacitor C3.

Field effect transistors Q1 and Q2 function as high frequency switches which alternately select a zero voltage and the voltage across C3 at a chopping rate of 8 kHz. This chopped voltage appears across field effect transistor Q2 and is coupled to an ac amplifier circuit by means of capacitors C7 and C6. The ac amplifier circuit consists of operational amplifier IC-1a, resistors R6, R7, R8, R9, R10, R11 and capacitor C8. This amplifier increases the amplitude of the square wave voltage appearing across transistor Q2 by a factor of approximately 32. The amplified signal from the output of the operational amplifier is coupled to a demodulating circuit by capacitor C9. The demodulating circuit consists of resistors R12 and R13, capacitor C10, and switches 2A and 2B of integrated circuit IC-3. Diodes D3 and D4 are normally non-conductive and serve only to protect the demodulator from excessive transient voltage excursions.

Switches 2A and 2B alternately conduct to provide a sample-and-hold type circuit in conjunction with capacitor C10. For zero armature current, the output at the junction of capacitor C10 and resistor R13, remains at the reference signal level of 11 volts. For a positive value of armature current, the output signal at the junction of R13 and C10 is negative with respect to the 11 volt reference level. This signal is amplified by the voltage follower circuit consisting of operational amplifier IC-1b and resistors R14 and R15. The output of this operational amplifier is a voltage which is proportional to armature current and is called the armature current feedback signal. For zero armature current, this signal has the reference level of 11 volts. It has a value of 7 volts for a 400 ampere armature current, and a value of 15 volts for a −400 ampere armature current.

2. ARMATURE CURRENT REFERENCE

The purpose of the armature current reference circuit is to generate a voltage which represents the desired value of motor armature current. This voltage is a function of the throttle position as indicated by the resistance of potentiometer P1, throttle switch S1 and motor speed. Potentiometer P1, in conjunction with resistors R26 and R65, form a voltage divider network which provides a voltage at the junction of resistors R26 and R65 which is a function of the throttle setting. The value of this voltage is also influenced by the collector current of transistor Q7 which provides a current that is dependent on motor speed. A voltage related to motor speed is applied to the base of transistor Q7 by means of Zener diode D8 and resistors R68 and R67. This base voltage becomes less positive as the motor speed increases and thereby provides a collector current which increases with increasing motor speed. The proportionality between this current and the base voltage is determined by the value of resistor R66. The collector current in conjunction with the voltage divider network and potentiometer P1, provides a voltage which is a function of both motor speed and throttle setting, and permits smooth control of the motor in both the motoring and regenerative braking modes. Capacitor C15 serves to filter out extraneous electrical noise signals.

The signal from the junction of resistors R26 and R65 is amplified by the amplifier stage consisting of operational amplifier IC-4A, resistors R31, R32, R33, R34, R35, R36, capacitor C22, diode D9, and switch 2C of integrated circuit IC-3. The gain of this amplifier depends on whether the motor is being operated in the high voltage battery connection or the low voltage battery connection. In the low voltage battery connection, switch 2C is open-circuited and the gain of the amplifier in the linear region is determined by the ratio of resistors R35 and R31. The maximum positive value of the amplifier output is limited by the network consisting of resistors R34 and R32 and diode D9 which conducts only for output voltages exceeding a given positive value with respect to the reference signal level of 11 volts. Capacitor C22 serves to reduce the gain for high frequency noise signals.

When the motor is operating in the high voltage battery connection, switch 2C conducts, thereby placing resistor R36 in parallel with resistor R35. This reduces the amplifier gain to approximately 46% of the gain obtained when operating in the low voltage battery connection. This change in gain serves to reduce the armature current reference demand for the same throttle setting when operating from the high voltage battery connection. This gain change makes it possible to approximately match the motor torques at low throttle settings independent of the low voltage or high voltage battery connection.

Throttle switch S1 is closed for throttle settings of less than 5%. With switch S1 closed, a ZERO signal is coupled to gate $U_4$ by means of low pass filter R28-C50. Diode D21 protects the gate from reverse voltage transients. With switch S1 closed, the output of gate $U_4$, which is labeled $\overline{T}$, has a logical value of ONE. This signal is coupled through NAND gate $H_1$ to provide output signal T, which has a value of ZERO when the throttle switch is closed. This signal is applied to NAND gate $K_1$ which in turn applies a ONE signal to the input of NAND gate $K_2$. This signal in conjunction with a RUN signal of value ONE, which indicates that the motor is running, provides a ZERO output from NAND gate $K_2$. This ZERO signal is connected to NAND gate $L_1$ which provides a ONE signal to switch 2D of integrated circuit IC-3. This causes switch 2D to conduct and hold the voltage at the junction of resistors R70 and R71 at the reference value of 11 volts. The ZERO output of NAND gate $K_2$ causes diode D24 to conduct and provide a current through resistor R76. This current causes a current reference value which demands regeneration.

During regeneration, when operating in the high voltage connection, the armature voltage may increase to over 100 volts. If one of the connections to the battery becomes loose so as to produce a high resistance connection, the voltage could rise substantially higher. In order to protect the field control circuit from excessive voltage, the network consisting of resistors R74 and R75 and diode D23 reduces the value of the regenerative current demand if the armature voltage exceeds 130 volts.

The power supply of the field control operates from the 48-volt battery voltage. When the batteries are nearly discharged, and when drawing high values of armature current, this voltage may fall to less than 30 volts unless the value of the armature current is suitably limited. The network consisting of resistors R72, R73 and diode D22 acts to reduce the value of motoring armature current whenever this battery voltage falls below 30 volts. Under this condition diode D22 conducts and limits the armature current reference and thereby prevents the voltage to the control from becoming excessively low.

At higher speeds, it is necessary to reduce the armature current in order to avoid sparking at the commutator and also to avoid excessive heating of the motor while running the vehicle continuously at high speeds. A signal obtained from the speed signal generator described below is introduced through resistor R44 to the junction of resistor R45 and diode D12. As the motor speed increases the signal applied to R44 becomes increasingly negative which lowers the voltage at the junction of R44 and R45. At approximately 3000 rpm, diode D12 begins to conduct thereby reducing the current reference signal applied to operational amplifier IC-4b. The current conducted by diode D12 increases with a further increase in motor speed, thereby further reducing the armature current reference signal.

Difficulties with commutator sparking also tends to occur at low field current values. The signal output from operational amplifier IC-4b is proportional to field current and becomes less positive as the field current is reduced. This signal is applied through resistor R48 to the junction of resistor R46 and diode D13. As the field current is decreased, the voltage at the junction of R46 and R48 becomes less positive until diode D13 begins to conduct. The current flowing through diode D13 serves to reduce the value of armature current reference.

3 SPEED SIGNAL GENERATOR

A magnetic pickup is magnetically coupled to a gear on the motor shaft which provides a frequency proportional to motor speed. The signal from this pickup which has a sinusoidal waveform is applied to resistor R52 of the speed signal generator. Resistor R53 serves to apply a bias current to input transistor Q8 by means of resistor R54. Capacitor C18 serves to attenuate any noise signals applied to the speed signal generator input. Diode D15 protects the transistor input from negative voltages. Transistor Q8 is biased so as to produce a square wave output at its collector. The collector signal is fed back to the input of the transistor by means of inverter gate $U_1$ and resistor R55. This signal provides hysteresis which helps to provide a good switching waveform from transistor Q8. The input signal applied to capacitor C19 varies between zero volts when transistor Q8 is conducting, and 11.7 volts as determined by reference Zener diode D16 when transistor Q8 is blocked. During the transition of this voltage toward zero volts, diode D17 conducts and places a charge across capacitor C19. When transistor Q8 blocks and the voltage applied to the capacitor rises toward 11.7 volts, diode D18 conducts and discharges the capacitor into the input of operational amplifier IC-5. The same amount of electrical charge is transferred through diode D18 into the operational amplifier input during each cycle of the square wave input. Therefore, the average current applied through diode D18 is proportional to the frequency of the input signal which is in turn proportional to motor speed. The proportionality between the output signal from operational amplifier IC-5 and speed is determined by the value of resistor R59. Resistor R60 provides a biasing input to the operational amplifier and thereby determines the voltage output for zero speed. Capacitor C21 serves to filter the ripple from the output signal and thereby provide a low ripple output voltage. Resistor R57 and capacitor C20 act as a low pass filter to provide an 11 volt bias to the anode of diode D17. Resistor R58 provides the 11 volt reference bias to the positive input of operational amplifier IC-5. The output of operational amplifier IC-5 is a voltage linearly related to motor speed which has a value of approximately 17 volts at zero speed, and decrease linearly in voltage by 3 volts for each 1000 rpm increase in speed.

4. ERROR AMPLIFIER

The error amplifier compares the armature current reference signal applied through resistors R70 and R71 as modified by the currents from diodes D12, D13, D22 and D23, with the armature current feedback signal applied through resistors R22 and R23. The difference in these signals represents an error signal which is amplified by operational amplifier IC-4B to provide a voltage signal which is proportional to the desired value of field current. In the steady state the gain of the operational amplifier is determined by resistor R47, while for more rapid variations the gain is determined by resistor R69 by means of the signal coupled through capacitor C17. Capacitor C16 acts to reduce the value of high frequency noise signals. The network consisting of resistors R49, R50 and diode D14 serves to limit the positive excursion of the operational amplifier output voltage. Bias is provided from the reference signal level of 11 volts to the positive input of the operational amplifier by means of resistor R51. The output of operational amplifier IC-4b normally lies between the limits of 6 volts and 16 volts with the more positive voltage calling for increased field current. This output voltage is applied to the field current output amplifier.

5. FIELD CURRENT OUTPUT AMPLIFIER

The field current output amplifier amplifies the voltage signal from operational amplifier IC-4b and provides a field current output to the motor. Pulse width modulation is used to maintain high efficiency when operating from both 48 volts and 96 volts. A pulse width modulation frequency of 2 kHz is used as determined by the signal applied to gate $K_3$. Under normal operating conditions, this signal has a value of ONE for a small fraction of the cycle and a ZERO value for the remainder of the cycle. The ONE period corresponds to the minimum conduction time desired for the output stage, and thereby determines a minimum value of field current. During this ONE signal, the output of inverting gate $K_3$ is at zero volts which draws a current through resistor R113 that causes transistor Q30 to conduct. When transistor Q30 conducts, it discharges capacitor C35. When the input signal to gate $K_3$ is a ZERO, transistor Q30 is blocked and capacitor C35 is charged in the negative direction by resistors R110 and R111. This produces a negative exponential waveform across capacitor C35. This signal will be referred to as the saw-tooth modulation waveform for the pulse width amplifier. The impedance of this signal is lowered by the emitter follower consisting of transistor Q29 and resistor R104. This signal is coupled to the voltage comparator consisting of transistors Q27, Q28 and resistor R106 by means of resistor R107. The field demand signal from operational amplifier IC-4b is coupled to the voltage comparator through resistor R108. Diodes D37 and D38 serve to protect the base-emitter junctions of transistors Q27 and Q28 from excessive voltage. The current in transistor Q28 switches between an essentially fixed level and a value of zero depending on whether the voltage of the base of transistor Q28 is more negative or more positive than the voltage of the base of transistor Q27. Switching from one current state to the other occurs when the voltages at the bases of transistors Q27 and Q28 are approximately equal. Since the voltage at the base of transistor Q28 depends on the sum of the saw-tooth modulation waveform and the field demand signal, a change in the field demand signal will shift the point on the saw-tooth modulation waveform at which the current changes from one value to the other. Therefore, the voltage comparator acts as a pulse width modulator having a width of conduction dependent upon the field demand signal. The pulse width signal from the collector of transistor Q28 is applied to the base of transistor Q26 and causes transistor Q26 to switch between the conducting and blocked states. The output of transistor Q26 is amplified and inverted by transistor Q25, and the output of transistor Q25 is amplified and inverted by transistor Q24. A positive feedback signal from the collector of transistor Q25 is fed back to the base of transistor Q27 by means of resistor R109 for the purpose of providing hysteresis and more rapid switching. Resistor R105 serves to bias the base of transistor Q27 near 11 volts. Resistor R130 provides a coupling from the 48 volt battery supply to the base of transistor Q27 which tends to keep the field output current constant as the battery voltage decreases. This action is obtained by a shift in the comparator voltage which serves to increase the conducting pulse width as the battery voltage decreases.

In order to ensure that the comparator Q27–Q28 is in the proper state to cause output field current conduction during the minimum pulse width signal provided at the input of gate $K_3$, a negative current is applied to the base of transistor Q27 through diode D36 and resistor R117. This current flows when transistor Q34 is conducting. Transistor Q34 conducts whenever the output of NAND gate $K_4$ is in a ONE state. This ONE state occurs whenever the output of inverter $K_3$ is a ZERO which corresponds to the input signal to $K_3$ being ONE. Transistor Q34 is also made to conduct when the signal RUN, which is applied to the input of gate $K_4$, is a ZERO. This occurs during motor idling conditions.

A ZERO signal is applied to gate $P_1$ whenever it is desired to cut off conduction of the output stage driving the field. This ZERO signal produces a ONE output from inverter $P_1$ which causes diode D47 to conduct. This current flows through resistor R118 and causes transistor Q26 to conduct which causes the output stage consisting or transistors Q35, Q36, Q37 and Q38 to block.

When transistor Q26 conducts, transistor Q25 blocks and transistor Q24 conducts. This causes the collector signal of transistor Q24 to be at approximately zero volts. This voltage is applied to the base of transistor Q35 through resistor R151 which causes transistor Q35 to block. With transistor Q35 blocked, resistor R147 holds the bases of transistors Q36, Q37, Q38 at zero volts which renders them in the blocking or non-conducting state.

The motor field is connected between the V96 terminal and the collectors of transistors Q35, Q36, Q37 and Q38. A free-wheeling diode Q45 is connected across the field to provide a path for the field current to circulate during the time when transistors Q35, Q36, Q37 and Q38 are blocking. The field current will decrease in magnitude during the time that the current circulates through diode D45. To increase the field current, transistors Q35, Q36, Q37 and Q38 are made to conduct, thereby causing their collectors to assume a potential of approximately 2 volts. This places a large voltage across the field which causes the field current to increase. The field current may be made to assume any desired value by correctly proportioning the time during which output transistors Q35, Q36, Q37 and Q38 conduct. Normally, transistors Q35, Q36, Q37 and Q38 conduct during a portion of each cycle of the 2kHz modulating waveform.

During the time that transistors Q35, Q36, Q37 and Q38 conduct, their emitter currents flow through resistors R148, R149 and R150. The sum of these currents, neglecting the small current which flows through resistor R147, is equal to the value of the field current. The voltages across the resistors are averaged by resistors R120, R121 and R122 to provide a voltage proportional to the field current. This voltage is applied to the base of transistor Q31 and is compared in magnitude to the voltage at the base of Q32 which represents the maximum permissible value of field current. When the value of field current is excessive, transistor Q32 conducts and transistor Q31 blocks. The conduction of transistor Q32 causes transistor Q33 to conduct which provides a ZERO signal to the input of inverting gate $P_2$. This causes the output of gate $P_2$, which is called MAXF, to be a ONE. When MAXF is a ONE, it represents the condition of maximum permissible field current. This ONE signal is applied to the input of inverting gate $P_3$ which applies a ZERO input to an input $N_1$ of flip-flop $N_1$–$N_2$. This causes the output of gate $N_2$ to apply a ZERO value to the input of gate $P_1$ which results in cutting off the output stage Q35, Q36, Q37 and Q38. Therefore, when the output current exceeds the maximum desired value, it results in cutting off the output stage transistors Q35, Q36, Q37, Q38 which in turn reduces the field current. Flip-flop $N_1$–$N_2$ is reset during each cycle of the 2 kHz modulating signal by signal $\overline{MINP}$ applied to gate $N_2$. Signal $\overline{MINP}$ lasts for only a small fraction of the cycle corresponding to the minimum pulse width signal. The output transistors Q35-Q38 remain non-conducting during the remaining portion of the cycle until the field current falls below the maximum desired value.

The value at which the maximum field current is regulated depends upon the logical value of the signal RUN. Before the motor 14 has been started and during the time that the motor 14 is idling, RUN is equal to ZERO, which results in a zero voltage being applied to resistor R125. This signal biases transistor Q32 of the regulator and causes it to regulate the maximum field current at a level of 8 A. This serves to conserve battery power, reduce heating of the field winding 18 and to insure that this value of maximum field current can be obtained even under low battery conditions. This latter condition is necessary because the safety circuits 7 require that the maximum field signal be present in order for the motor 14 to be started. Once the motor 14 is started, RUN becomes a ONE which applies a 12V signal to resistor R125 and results in the maximum value of field current being regulated at about 12A.

6. LOGIC

Logic gates $B_1$, $B_2$, resistors R131 and R132, and capacitor C40 form a 64 kHz oscillator as described in the RCA COS/MOS Integrated Circuit Manual (Technical Series CMS-271). The output of this oscillator consists of a rectangular waveform that is connected to the input of binary counter C. The following square wave outputs are taken from the binary counter: q2 at 16 kHz, q3 at 8 kHz, q4 at 4 kHz and q5 at 2 kHz. The complements of these signals are provided by inverting gates $A_1$, $A_2$, $E_5$ and $E_6$ respectively.

The ZERO period of square wave q3 is shortened by the pulse shaping circuit consisting of logic gates $A_3$ and $A_4$, resistor R112, capacitor C39 and diode D39. When q3 becomes a ONE, diode D39 conducts and quickly discharges capacitor C39. Therefore, the ZERO-to-ONE transition at gate $A_4$ is delayed by only a short value of time. However, when q3 becomes a ZERO, the output of gate $A_3$ becomes a ONE and capacitor C39 is slowly charged positive through resistor R112. This causes the output from gate $A_4$, which corresponds to the ONE-to-ZERO transition of q3, to be delayed. The result is that the output from gate $A_4$ has a shorter ZERO period than square wave signal q3.

When in the high voltage battery connection, LOW = ZERO and logic gate $B_4$ simply inverts the signal from logic gate $A_4$. The output from gate $B_4$, the ONE period of which represents the minimum pulse width desired for the pulse width modulator conduction, is combined with the $\overline{q4}$ and $\overline{q5}$ signals in gate $D_1$ to provide a signal having a 2 kHz repetition rate and a ZERO period corresponding to the minimum pulse width. This signal is called $\overline{MINP}$. This signal is applied to gate $G_1$ and provides a ONE output from gate $G_1$ during the minimum pulse period. When in the low battery connection, LOW is a ONE which gates the $\overline{q2}$ signal through gate $B_3$ into gate $B_4$. This results in a 50% increase in the minimum pulse width.

The following description of the logic will be related to the sequence of events beginning with energizing the control, running at low speed, accelerating to high speed, returning to the low speed, running at idle speed, and finally shutting off the controller. When the car key switch is turned on, 48 volts is applied to the controller power supply and the Key 12V voltage is connected to the Q21 output stage. The power supply provides the +22, +14, +12 and +11 voltages to the circuit. The +48V is also applied to the V96 terminal at the cathode of D45 of the field current output stage. At this point the motor is not running and the signal RUN is in the ZERO state, which results in a zero voltage being applied to resistor R125 associated with voltage comparator Q31, Q32. This selects a maximum field current of approximately 8 amperes and, since the RUN signal applied to gate $K_4$ is a ZERO, the pulse width modulated field output amplifier demands this maximum field current of 8 amperes. The presence of this maximum regulated field current causes the signal MAXF to be a ONE.

When the throttle pedal is depressed, throttle switch S1 opens causing signal T to become a ONE. With both MAXF and T being equal to ONE at the input of gate $G_2$, gate $G_2$ produces a ZERO output which sets the flip-flop $F_1$–$J_1$ such that the signal RUN becomes a ONE. At this time the signal UP is a ZERO and the signal LOW is a ONE so that the signals applied to the input of gate $J_3$ are all in the ONE state, which provides a ZERO output from $J_3$ which is inverted to provide a ONE output from gate $M_1$. This signal is inverted by gate $M_2$ which provides a zero voltage output to resistor R91 which causes transistor Q16 to block and permits resistor R86 to energize transistor Q15 which conducts and energizes the coil of contactor L. This closes the contacts of contactor L which connects 48V to the armature of the motor thereby causing the motor to accelerate to approximately 960 rpm. The ONE signal from $M_1$, after a delay of several tenths of a second as determined by resistor R138 and capacitor C51, causes inverter $M_3$ to change state from a ONE to a ZERO which results in transistor Q17 conducting and energizing contactor M. This places the second half of the battery string in parallel with the first battery string across the armature of the motor. This delay is provided so that the starting of the motor occurs at a somewhat higher impedance, thereby reducing the motor inrush current. During this delay of several tenths of a second, the signals from inverters $M_1$ and $M_3$, applied to gate $F_4$, are both in the ONE state. This produces a ZERO from the output of gate $F_4$ which is applied to an input of gate $G_1$ to demand full field current from the field current output amplifier. At the end of this delay when the output from inverter $M_3$ becomes a ZERO, this full current demand signal is removed and the field current depends upon the throttle setting. The ZERO output from gate $M_3$ also sets flip-flop $G_3$–$H_5$ which energizes the coil of relay R by means of transistors Q22 and Q21. Relay R connects a 12V battery to the armature through a diode whose cathode is at the armature voltage. Since the armature is connected to 48V at this time, this diode does not conduct. However, at a later time when the motor slows to several hundred rpm and the armature voltage falls below 12V, this diode will conduct and keep the motor idling at several hundred rpm. This flip-flop is reset when the power is removed from the controller.

If the throttle is further depressed, an increased value of armature current is demanded which results in an armature current error which in turn reduces the field current. This causes an increase in armature current and the motor accelerates to a higher speed. As the speed increases to a value in the range of 1500–1900 rpm, the speed signal generator output applied through resistor R41 becomes more negative or in actual operation since the signal never goes negative, it becomes less positive. This signal is summed at the base of transistor Q10 along with a throttle voltage signal coupled through resistor R40, an armature current reference signal coupled through resistor R39, a battery voltage signal coupled through resistor R38, and a zero volt bias signal coupled through resistor R37. When the voltage at the base of Q10 falls below the 11V reference voltage applied to the base of Q11, transistor Q10 will conduct and its collector will provide a ONE input to gate $G_4$. The signal T is also a ONE, as long as the throttle remains depressed, and therefore the output of gate $G_4$ will be a ZERO. This output is called $\overline{SPD}$ and is applied to gate $F_2$ of flip-flop $F_2$–$J_2$. When $\overline{SPD}$ becomes a ZERO, it sets flip-flop $F_2$–$J_2$ and the output of gate $E_1$, which is driven by this flip-flop, becomes a ONE. This output is called UP and when it becomes ONE, it indicates that the control should begin the sequence required to reconnect from 48V to 96V.

When UP becomes a ONE, the $\overline{UP}$ signal applied to gate $J_3$ becomes a ZERO which results in de-energizing the L and M contactors. Diode D42 acts to discharge capacitor C51 rapidly and avoid an unnecessary delay for the signal coupled between the gates $M_1$ and $M_3$.

At this point in time, the UP and LOW signals applied to gate $F_3$ are both in the ONE state and therefore a ZERO output is obtained from gate $F_3$. Capacitor C41 is discharged after a short delay through the parallel paths of resistors R133 and R134, since diode D40 conducts when the output of $F_3$ is at the zero volts. The output across capacitor C41 becomes ZERO and this signal is applied to gate $G_1$ and demands full field current regardless of other signals applied to G1. As the field current is increased with contactors L, M and S open, the motor acts as a generator and applies an increasing voltage to the field. This further increases the rate of field current so that the full field current is reached within a few tenths of a second and the motor emf rises toward 96V.

Meanwhile, the delayed UP signal, which is delayed by resistor R140 and capacitor C45, rises to a ONE value. This signal is applied to inverter $H_4$ and produces an output signal LOW = ZERO. This signal is inverted by inverter $M_4$ to produce signal HIGH = ONE. The combination of UP, RUN and HIGH all having a value of ONE applied to gate I produces a ZERO output which is coupled through gates $M_5$ and $M_6$ and transistor $Q20$ to turn on transistor $Q19$ and energize the S contactor. This contactor connects the two battery strings in series to provide 96V to the motor armature and to the 96V connection to the cathode of diode $D45$ of the field current amplifier.

When the signal LOW becomes ZERO, the output of gate $F_3$ returns to a ONE condition. This signal is delayed by resistor $R134$ and capacitor $C41$ for about a tenth of a second to allow time for contactor S to close before applying a ONE signal to gate $G_1$ and thereby removing the full field current demand. During the time that the full field demand signal is applied, the output from capacitor $C41$ is coupled by means of gates $E_2$ and $E_3$, $O_1$, $P_4$, and $L_1$ to switch $2D$. This switch $2D$ provides a ZERO armature current reference demand signal at the junction of resistors $R70$ and $R71$ which matches the near ZERO armature current which results from contactors L, M and S all being open. This prevents a large error signal from building up at the output of operational amplifier IC-4b which could cause an undesirable transient upon removal of the full field current demand signal.

With HIGH = ONE, the motor is run with 96V applied to the armature. As the throttle is depressed, the motor speed will increase toward its full speed value of 3300 to 3600 rpm.

When slowdown of the vehicle is desired, the operator will reduce the throttle setting. This will reduce the current demand reference toward zero amperes and may even result in a negative current (regenerating current) demand. If a throttle setting of less than about 5% occurs, throttle switch S1 will close and $\overline{T}$ will become a ONE. As the motor slows down, the value of the field current will be increased in order to maintain the desired value of field current at lower motor speed. When the field current reaches its maximum regulated value, MAXF will become a ONE. As the motor slows further, the magnitude of the negative armature current (regenerative current) will be reduced and output IPLUS of logic gate $A_5$ of the armature current comparator described below under "Safety" will become a ONE. This indicates that the amount of regenerative current has become negligible.

At this point the inputs to logic gate $D_3$, MAXF, $\overline{T}$ and IPLUS are all ONE's which provides a ZERO output from gate $D_3$ to reset flip-flop $F_2$-$J_2$ to the state corresponding to UP = ZERO. This indicates that the sequence to reconnect the batteries from 96V to 48V should be initiated. The UP = ZERO signal is applied through gates I, $M_5$, $M_6$, and transistors $Q20$ and $Q19$ to de-energize contactor S. With the signals $\overline{UP}$ and HIGH applied to gate $O_2$ both being ONE's, the output of gate $O_2$ becomes a ZERO and, after a delay determined by the parallel combination of resistors $R145$ and $R146$ and capacitor $C52$, sets flip-flop $N_1$-$N_2$ to a state that demands minimum field current. The motor emf, which is only applied to the motor field since contactors L, M and S are all open, falls toward a value near 48V as the field current is reduced.

The UP signal transition from a ONE to a ZERO is delayed for about a tenth of a second by resistor $R140$ and capacitor $C45$ in order to permit time for contactor S to open before beginning to energize contactors L and M. At the end of this delay, the output of capacitor $C45$ changes the output of gate $H_4$ to a ONE. This output signal called $\overline{LOW}$ then becomes a ONE and is applied through gate $M_4$ to make its output signal HIGH become a ZERO. Since the RUN, UP and $\overline{LOW}$ signals are all ONE at this time, they act through gates $J_3$, $M_1$, $M_2$ and $M_3$ and transistors $Q16$, $Q15$, $Q18$ and $Q17$ to energize contactors L and M which connect the 48V battery strings in parallel to the armature of the motor.

The transition of HIGH to a ZERO causes the output of gate $O_2$ to become a ONE. This signal is delayed by resistor $R146$ and capacitor $C52$ for about a tenth of a second to permit contactor S to pull in before removing the minimum field signal. During the transition period from 96V to 48V, the signal from capacitor $C52$ is coupled through gates $O_1$, $P_4$ and $L_1$ to switch $2D$. This provides a ZERO reference current signal as previously described to prevent the build up of an excessive error signal at the output of operational amplifier IC-4b.

If the throttle remains at a low setting, a regenerative current will again flow and result in further slowing of the vehicle and motor. The field current which had a low value at the time that contactors L and M pulled in, following the reconnection from 96V to 48V, is now increased to provide the desired armature current as the motor slows. Once the maximum value of field current is reached, the value of regenerative current will diminish and IPLUS will finally become a ONE, indicating negligible regeneration current. Assuming that a zero throttle setting still exists, the signals LOW, $\overline{T}$ and IPLUS applied to gate $D_2$ will all be ONE's and provide a ZERO output from gate $D_2$. This ZERO output will discharge capacitor $C42$ through resistor $R136$ and result in a ZERO signal being applied to gate $J_1$ to reset the $F_1$-$J_1$ flip-flop. This produces a RUN = ZERO output which opens contactors L and M. With the armature disconnected from both the 48V and 96V battery connections, the motor will slow down until its back emf falls below 12V, at which time the 12V battery will provide current through relay contacts R and the series diode to the motor armature. This will keep the motor running at an idle speed of about 200 rpm which maintains pump pressure in the automatic transmission and provide for smoother vehicle restarting without dissipating excessive power in either the motor or the automatic transmission. Idling at 200 rpm requires only about 100 watts as opposite to 500 or more watts at 960 rpm. When the key is turned off, relay R will open and all voltages will be removed from the controller. The motor will then stop and all capacitors in the control will discharge. When the key is turned on again, all of the flip-flops in the control will come on in the reset state because of the R-C networks applied in one side of the flip-flop cross coupling. These R-C networks also increase the time necessary to set the flip-flops and thereby provide increased immunity to noise. $R137$ and $C43$ are a typical example of the R-C network for flip-flop $F_1$-$J_1$. Similar networks are used for flip-flops $F_2$-$J_2$, $O_4$-$P_5$ and $N_1$-$N_2$.

To reduce battery drain and field dissipation the field current regulator level is reduced from 12A to 8A when RUN = ZERO. This is accomplished by means of resistor $R125$. This also ensures that the MAXF signal will be present during idling and before motor start-up when the field operates from voltages in the 48-volt range. Under low voltage conditions it may only be possible to reach 11A field current. Reducing the regulated level to 8A ensures that MAXF is a ONE since this is what regulates the field current. MAXF = ONE is needed for setting RUN = ONE.

Switch 2A is made conductive during the latter portion of one-half of the 8 kHz chopping period. This signal is derived in NOR gate $U_2$ using input signals $\overline{q2}$ and $\overline{q3}$. Similarly, switch 2B is made conductive during the latter portion of the other half of the 8 kHz period by means of signals $\overline{q2}$ and $q3$ applied to NOR gate $U_3$.

A 12V signal is provided to control the automatic transmission by means of transistor Q23 and resistors R99 and R100. This transistor is made to block when HIGH = ONE as controlled by the signal from gate $H_3$ and resistor R98. Capacitor C34 across the transistor protects the transistor from noise impulses.

There are unusual conditions that will prevent reconnection from 48V to 96V. One such condition is getting a wheel of the vehicle stuck in a severe road depression. Under these conditions, the motor speed will remain below the value needed to call for reconnection to 96V. Another possible condition would be a severe grade with a discharge battery. Under these conditions the additional power available in the 96V connection is required even though the reconnection cannot be achieved in a fully smooth manner. The circuit consisting of resistors R155 and R156, capacitor C54, diodes D48, D49 and D50, and transistor Q40 serves to sense when the throttle is fully depressed. Under these conditions the input to resistor R155 approaches ground potential and transistor Q40 will be blocked. Under this condition resistor R157 applies a positive potential to the long time constant filter consisting of resistor R160 and capacitor C55. After a time of approximately $2\frac{1}{2}$ seconds, this filter will apply a ONE signal to gate $U_5$. The output of gate $U_5$ becomes a ZERO which causes diode D52 to conduct and draw current through resistor R158. This current reduces the motor speed at which the reconnection from 48V and 96V occurs by about 600 rpm, and therefore insures that the reconnection will occur. Under normal operating conditons with the throttle fully depressed, the motor speed will increase to a value sufficient to cause reconnection from 48V to 96V in approximately one second. Therefore, the time delay of resistor R157 and capacitor C55 will prevent any response from gate $U_2$ and diode D52 will remain in its normally non-conducting state.

7. SAFETY CIRCUITS

A number of safety circuits 7 are provided to protect the controller and the vehicle in case of malfunctions or human error. When the brake is applied, the brake switch connects a 12V signal through a filter consisting of resistor R24, capacitor C14 and diode D7 to gate $H_2$. The resulting ZERO output from gate $H_2$ acts through gates $K_1$, $K_2$ and $L_1$ to make switch 2D conduct and cancel any input signal provided from the throttle potentiometer. At the same time, the ZERO output from gate $K_2$ causes diode D24 to conduct which provides a regenerative braking command. Therefore, depressing the brake results in a regenerative braking action from the motor even if the thottle was stuck in a fully depressed position.

The output of the speed signal generator from operational amplifier IC-5a is applied by means of resistors R61, R62 and R63 to an overspeed detection transistor Q9 which conducts if the motor speed exceeds 3700 rpm. Conduction of this transistor causes a ONE signal to be applied at the input of gate $A_6$. This signal is inverted by gate $A_6$ and applied to gate $G_1$ to demand full field current from the field current output amplifier. The increased field current when operating at this high motor speed will cause regenerative braking which should slow the vehicle. As soon as the motor speed is reduced below 3700 rpm, the full-field demand signal will be automatically removed. If there is a malfunction in the control circuit and the full field signal is not successful in reducing the motor speed, then emergency action is necessary. In that case the signal from $A_6$, which is coupled through gate $P_6$ to the delay circuit consisting of resistors R141, R142, diode D43, capacitor C46, is utilized. In this case the output signal from $P_6$ is a ONE and it is delayed for several tenths of a second by resistor R142 and capacitor C46. If after this delay time the armature current has not achieved a substantial regenerative value, the IPLUS signal applied to gate $O_3$ will be a ONE along with the delayed ONE signal from capacitor C46. This will result in a ZERO output from gate $O_3$ which will set the trip flip-flop consisting of gates $O_4$ and $P_5$ such that $\overline{ATRIP}$ becomes a ZERO. This signal is applied to gate $J_1$ of flip-flop $F_1$-$J_1$ and resets RUN to a ZERO. This causes all of the armature circuit contactors to open and remain open.

The voltage output of operational amplifier IC-1b, which represents the armature current, is applied to overcurrent detecting transistor Q3 by means of resistor R16. Resistor R17 serves to bias the switching point of transistor Q3 at an appropriate value. If the armature current exceeds 500 A, transistor Q3 will conduct and apply a ONE input signal to inverting gate $A_6$. The resulting ZERO output from gate $A_6$ is applied to gate $G_1$ and results in a full field current output signal from the field current output amplifier. This signal should quickly reduce the value of armature current below the 500 A level and thereby cause transistor Q3 to return to its normally blocking condition. If this does not occur, it indicates a malfunction of the control circuitry. In this cause the same series of events involving gates $P_6$, $O_3$ and the trip flip-flop $O_4$-$P_5$ as described above for the overspeed condition, will result in opening contactors L, S and M.

The output signal from operational amplifier IC-1b is applied to comparator $Q_4$-$Q_5$ by means of resistors R19 and R20. The values of resistors R19 and R20 are selected so that transistor Q4 will be blocked only if a substantial regenerative current of at least $-10$ A is flowing. Thus, for zero or positive armature current, transistor Q4 will be conducting and Q5 will be blocked. This provides a ZERO input to gate $A_5$ which produces a ONE signal at its output. This output signal is called IPLUS and indicates a near zero or positive armature current value.

If the motor was started without a field signal being present, excessive values of armature current would be drawn. To prevent this condition, a field current must be present having a value equal to the maximum regulated value of 8A. When this value is present, the signal MAXF will be a ONE. This signal, in addition to the signal T = ONE, must be present at the input of gate $G_2$ in order to set flip-flop $F_1$-$T_1$, which results in starting the motor.

If the motor is subjected to high currents for a continuing period, such as would be the case for climbing an exceptionally long, steep grade, the motor may overheat to a point where it is necessary to cut on the maximum available armature current even though the performance of the vehicle is appreciably degraded. A temperature sensor placed in the motor is used to sense a condition of excessive temperature. Under overtemperature conditions this sensor will apply a 12V signal through resistor R153 to transistor Q39. This signal will cause transistor Q39 to conduct and in effect place resistor R154 in parallel with resistor R14. This will result in increasing the gain of operational amplifier IC-1b. This will result in an increase in the armature current feedback signal for a given level of armature current. Since the armature feedback signal is compared with the armature reference signal, this will result in reducing the actual armature current to the motor. The motor will therefore dissipate less heat although the performance of the vehicle will be adversely affected. Under normal conditions resistor R159 will keep transistor Q39 in a blocking condition and R154 will not influence the operation of the circuit.

8. POWER SUPPLY

The power supply 8 operates from the nominal 48V battery connection. Capacitor C26 serves to filter out transient voltage spikes. When the batteries are badly discharged, the actual value of this voltage may drop as low as 27V. During regenerative conditions the voltage may rise as high as 60V. This supply is designed to provide regulated voltages of +22V, +14V, +12V and +11V even though the input voltage varies over the wide range indicated above. Furthermore, the +11V voltage, which is used to represent a virtual ground or zero reference signal for the control, is designed to be exactly one-half of the 22V voltage. This is accomplished by comparing the 11V signal with a signal representing one-half of the 22V signal as provided by resistors R80 and R77. This comparison takes place in operational amplifier IC-5b, the output of which drives amplifying transistor Q14. Q14 is coupled to a series regulating transistor Q12 by means of diode D25 and resistors R81 and R82. Transistor Q12 is made to conduct just enough current to maintain the value of the 22V output from its emitter to be equal to twice the value of the 11V reference. As the value of the 48V signal changes, the current drawn through resistor R81 is changed to compensate for changes in the current in resistor R82.

The +11V and +14V voltages are derived through a Zener-diode, diode regulating chain consisting of Zener-diode D27 and diodes D28, D29, D30 and D31 and resistor R83. The base of transistor Q13 is connected into this regulating chain. The voltage from its emitter is used to supply the +12V voltage to the logic circuitry. Transistor Q13 isolates the fluctuating demand current drawn by this logic from the Zener-diode, diode chain. Capacitors C27, C28 and C29 are used to bypass to ground the +22V, +12V and +11V supplies respectively.

The disclosed invention has several advantages over the prior art such as switching from the low voltage battery connection to the high voltage battery connection as soon as possible. This provides best performance, higher available torque and increases efficiency. The disclosed system takes into account various conditions of the battery and switches sooner to the higher voltage condition for low battery voltage. The disclosed electrical system also takes into account the current demand and switches to the high voltage condition sooner for a heavy current demand. The disclosed system remains in a high voltage connection as long as feasible and provides regeneration as long as practical.

Figure 8:
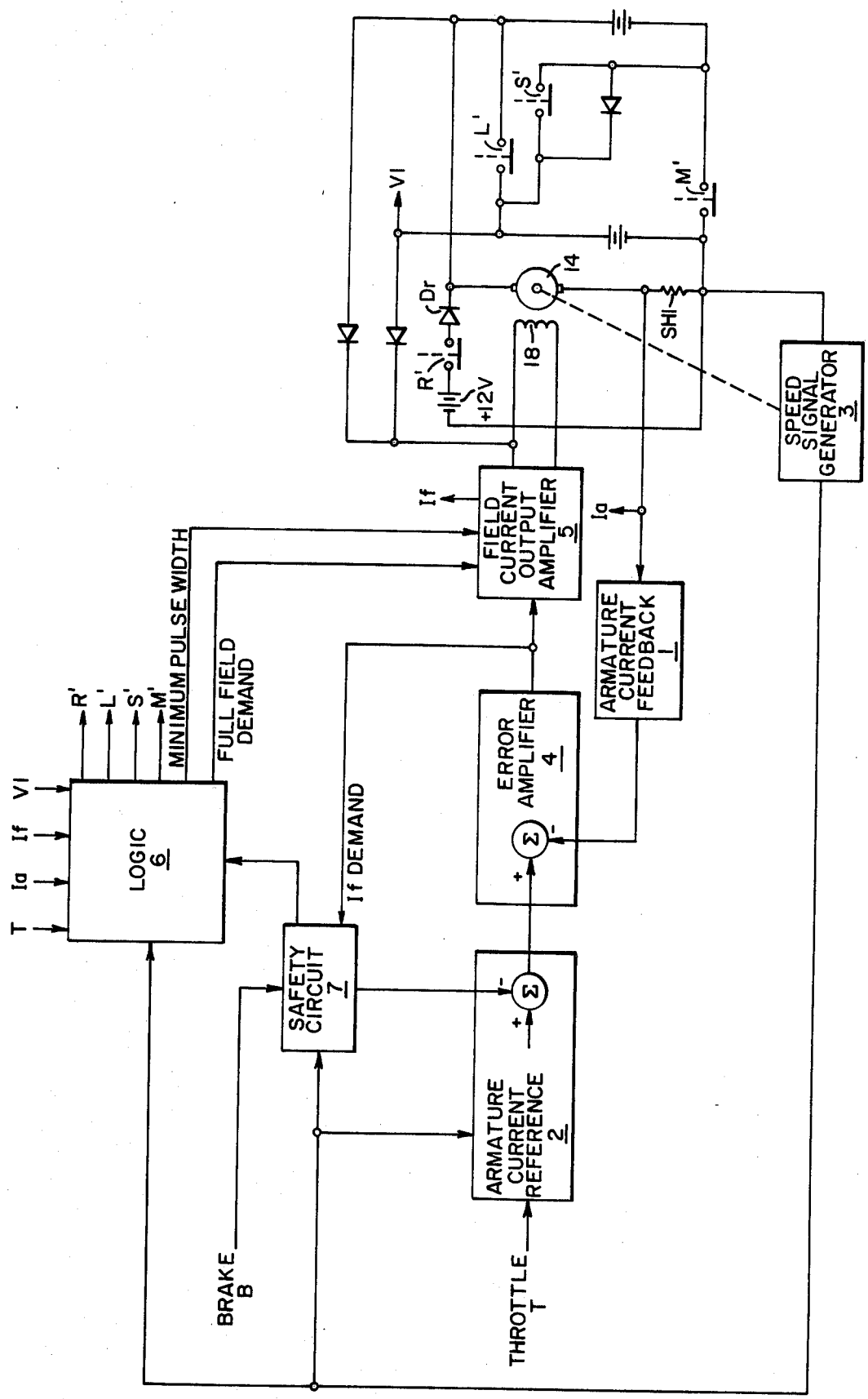

FIG. 8 is a block diagram of the control circuit 100 shown in FIG. 2 and described fully above.

I claim:

1. An electric vehicle comprising:
   a direct current drive motor;
   a separately excited field winding disposed within said direct current drive motor;
   a plurality of electric batteries connectable in a high voltage connection and a low voltage connection for supplying power to the armature of said direct current drive motor;
   a throttle connected to control current flow through said separably excited field winding which regulates armature current and output torque of said direct current drive motor;
   switching means for changing the connection of said plurality of batteries as a function of drive motor speed, armature current, battery voltage and throttle setting; and,
   current limiting means for regulating the maximum armature current which can flow through said direct current drive motor to prevent damage to said electric vehicle components.

2. An electric vehicle as claimed in claim 1, wherein:
   said direct current drive motor being operable in a torque matching mode where for a given throttle setting the output torque in said direct current drive motor can be matched for the high voltage connection and the low voltage connection, and a maximum performance mode where for a given throttle setting the output torque of said direct current drive motor cannot be matched for the high voltage connection and the low voltage connection; and,
   torque matching means for varying current flowing through said separably excited field winding to match the output torque of said direct current motor when said direct current drive motor is operating in a torque matching mode and said switching means changes the connections of said plurality of electric batteries from the low voltage connection to the high voltage connection.

3. An electric vehicle as claimed in claim 1, wherein:
   said direct current drive motor is operable in a torque matching mode where for a given setting of said throttle the output torque of said direct current drive motor for the low voltage connection before switching can be matched with the output torque of said direct current drive motor for the high voltage connection after switching and a maximum performance mode where for a given setting of said throttle the output torque of said direct current drive motor for the low voltage connection before switching is less than the output torque of said direct current drive motor for the high voltage connection after switching; and,
   first logic means for determining the minimum motor speed for a given throttle setting at which the connection of said plurality of electric batteries can be switched from the low voltage connection to the high voltage with an armature current not greater than a predetermined value; and,
   said first logic means activating said switching means to change said plurality of electric batteries to the high voltage connection.

4. An electric vehicle as claimed in claim 1, including:
   an optimum switching point means connected to and controlling said switching means for causing said switching means to change the connection of said plurality of batteries from a low voltage connection to a high voltage connection at the minimum speed of said direct current drive motor for a given throttle setting at which current flowing through said armature winding is not greater than a predetermined value; and, a field current controller for increasing the current flow through said separately, excited field winding during a switching operation.

5. An electric vehicle as claimed in claim 3, wherein said first logic means activates said switching means to change said plurality of electric batteries from the low voltage to the high voltage connection when $$n = (2V_1/k$$

where:
- $n$ = motor speed;
- $v_1$ = output voltage of one of said plurality of batteries; and,
- $k$ = a constant.

6. An electric vehicle as claimed in claim 3, wherein said first logic means activates said switching means to change said plurality of electric batteries from the low voltage to the high voltage connection when $$n = \frac{2V_1 - k_3 \, Var \, (Ra + 2Rb)}{k}$$

where:
- $n$ = motor speed
- $v_1$ = battery output voltage
- $Ra$ = armature resistance
- $Rb$ = battery resistance
- $Var$ = a voltage proportional to armature current
- $k, k_3$ = selected constants.

7. An electric vehicle as claimed in claim 3, wherein said first logic means activates said switching means to change said plurality of electric batteries from the low voltage connection to the high voltage connection when:

$$n = \frac{2V_1 - (k_1 V_T - k_2' \, Var)(Ra + 2Rb)}{k}$$

where:
- $n$ = motor speed;
- $v_1$ = battery output voltage;
- $Ra$ = armature resistance;
- $Rb$ = battery resistance;
- $V_T$ = a voltage proportional to throttle setting;
- $Var$ = a voltage proportional to armature current; and
- $k_1, k_2', k$ = selected constants.

8. An electric vehicle as claimed in claim 3, wherein:
said switching means comprises diodes disposed in the parallel paths through said plurality of batteries and a switch disposed in the series path through said batteries; and including,
control means for switching the batteries from the high voltage connection to the low voltage connection while vehicle speed is decreasing when field current reaches some maximum and armature current becomes positive.

9. An electric vehicle as claimed in claim 8, wherein said control means comprises:
a first voltage comparator to compare field current to a maximum desired field current and supply a signal when actual field current is at least equal to the maximum desired field current;

a second voltage comparator to compare armature current to some predetermined level and supply a signal when equal;
second logic means to activate said switch means to switch to low level when said first voltage comparator and said second voltage comparator both supply a signal.

10. An electric vehicle as claimed in claim 3, wherein:
said switching means comprises a first set of contact means disposed in the parallel through said plurality of batteries and a second set of contacts disposed in the series path through said batteries; and including;
control means for switching the batteries from the high voltage connection to the low voltage connection while vehicle speed is decreasing and when field current reaches some predetermined maximum.

11. An electric vehicle as claimed in claim 10, wherein said control means comprises a voltage comparator to compare field current to some maximum field current and to activate said switching means when said maximum field current is reached.

12. A drive system for an electric vehicle comprising:
a direct current drive motor having an armature winding;
a separately excited field winding disposed within said direct current drive motor;
a plurality of electric batteries connectable in a high voltage connection and a low voltage connection for supplying power to the armature of said direct current drive motor;
a throttle connected to control current flow through said separably excited field thereby controlling the speed of said direct current drive motor;
first switching means for changing the connection of said plurality of batteries from a low voltage connection to a high voltage connection at some selected speed determined as a function of battery output voltage; and
said first switching means switches from said low voltage connection to said high voltage connection at a vehicle speed as determined from the equation $$n = \frac{2 \, Vb - (Ra + 2Rb)p(Ia \text{ demand})}{k}$$

where:
- $n$ is the vehicle speed;
- $Vb$ is the voltage of one of said plurality of batteries;
- $Ra$ is the resistance of the armature of said direct current drive motor;
- $Rb$ is the resistance of one of said plurality of batteries;
- $Ia$ demand is a signal proportional to the setting of said throttle; and
- $p$ and $k$ are constants selected to give the desired operation.

13. A drive system as claimed in claim 12, wherein:
armature current is proportional to $Ia$ demand up to some maximum current designated Imax and then armature current is proportional to Imax.

14. A drive system for an electric vehicle comprising:
a direct current drive motor having an armature winding;
a separately excited field winding disposed within said direct current drive motor;

a plurality of electric batteries connectable in a high voltage connection and a low voltage connection for supplying power to the armature of said direct current drive motor;

a throttle connected to control current flow through said separably excited field thereby controlling the speed of said direct current drive motor;

first switching means for changing the connection of said plurality of batteries from a low voltage connection to a high voltage connection at some selected speed determined as a function of battery output voltage; and, a second switching means for changing the connection of said plurality of batteries from a high voltage connection to a low voltage connection when the electric vehicle is decelerating and the field excitation of said separably excited field is at least equal to 100% field excitation.

15. A drive system as claimed in claim 14 wherein: said second switching means changes connection from a high voltage connection to a low voltage connection when the current flowing through the armature of said direct current drive motor becomes positive.

16. A drive system for an electric vehicle as claimed in claim 14, wherein said first switching means changes battery connection at some selected speed determined as a function of battery output voltage and armature current.

17. A drive system for an electric vehicle as claimed in claim 14, wherein said first switching means changes battery connection at some selected speed determined as a function of battery output voltage, throttle setting, and armature current.

18. An electric vehicle comprising:
a direct current drive motor;
a separably excited field winding disposed within said direct current drive motor;
a plurality of electric batteries connectable in a high voltage connection and a low voltage connection for supplying power to said electric vehicle;

first switching means for changing the connection of said plurality of batteries from the low voltage connection to the high voltage connection;

an optimum operation controller means for causing said switching means to switch from the low voltage connection to the high voltage connection, during acceleration of said electric vehicle, at the minimum speed for which the field current in the high voltage connection required to keep armature current below a predetermined value remains below 100% of rated field current; and, a second switching means for changing the connection of said plurality of batteries from a high voltage connection to a low voltage connection when the electric vehicle is decelerating and the field excitation of said separably excited field is at least equal to 100% field excitation.

19. An electric vehicle as claimed in claim 18 wherein said plurality of batteries are switched from the low voltage connection to the high voltage connection at a speed less than that determined from $$n = (2V_1/k)$$

where:
$n$ is the vehicle speed;
$V_1$ is the battery voltage of one of said plurality of batteries; and,
$k$ is a constant selected to provide the desired performance.

20. An electric vehicle as claimed in claim 18 wherein said first switching means comprises:
torque matching switching means for switching said plurality of batteries in a torque matching mode where the output torque of said drive motor is approximately equal before and after switching; and,
non-torque matching switching means for switching said plurality of batteries in a non-torque matching mode where the output torque of said drive motor is greater after switching than the torque before switching.

* * * * *